US011023615B2

(12) United States Patent
Larson et al.

(10) Patent No.: US 11,023,615 B2
(45) Date of Patent: *Jun. 1, 2021

(54) INTELLIGENCE AND ANALYSIS DRIVEN SECURITY AND COMPLIANCE RECOMMENDATIONS

(71) Applicant: Microsoft Technology Licensing, LLC, Redmond, WA (US)

(72) Inventors: Karissa C. Larson, Mill Creek, WA (US); Churli Su, Bellevue, WA (US); Wenjie Liang, Bellevue, WA (US); Binyan Chen, Bellevue, WA (US); Ben Appleby, Issaquah, WA (US); Anupama Janardhan, Bellevue, WA (US); Ning Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,979

(22) Filed: Jan. 27, 2020

(65) Prior Publication Data
US 2020/0159959 A1 May 21, 2020

Related U.S. Application Data

(63) Continuation of application No. 15/462,466, filed on Mar. 17, 2017, now Pat. No. 10,579,821.

(Continued)

(51) Int. Cl.
*G06F 21/62* (2013.01)
*G06F 21/55* (2013.01)
(Continued)

(52) U.S. Cl.
CPC ........ *G06F 21/6245* (2013.01); *G06F 21/552* (2013.01); *G06F 21/60* (2013.01); *G06Q 10/101* (2013.01); *H04L 67/42* (2013.01)

(58) Field of Classification Search
CPC .... G06F 21/6245; G06F 21/552; G06F 21/60; G06F 21/602; G06Q 10/101; H04L 67/42; H04L 63/1441
See application file for complete search history.

(56) References Cited

U.S. PATENT DOCUMENTS

| | | | |
|---|---|---|---|
| 2011/0022642 A1* | 1/2011 | deMilo | G06F 21/602 707/805 |
| 2012/0210434 A1* | 8/2012 | Curtis | H04L 63/1441 726/25 |

(Continued)

OTHER PUBLICATIONS

"Non Final Office Action Issued in U.S. Appl. No. 15/471,243", dated Apr. 1, 2020, 10 Pages.

*Primary Examiner* — Shanto Abedin
(74) *Attorney, Agent, or Firm* — Michael Best & Friedrich LLP

(57) ABSTRACT

Hosted services provided by service provider tenants to their users are an increasingly common software usage model. The usage of such services and handling of data may be subject to regulatory, legal, and industry-based rules, where different rules may be applicable depending on the particular service, handled data, and organization type, for example. Embodiments are directed to providing intelligence and analysis driven security and compliance suggestions for hosted services to reduce the burden on tenant administrators to determine and implement applicable policies and rules. Claims are directed to determination of a suggestion based on an analysis of a tenant's service environment, presentation of the suggestion along with analysis results and a prompt to confirm implementation of the suggestion, and upon receiving confirmation, presentation of an option to customize the suggestion by modifying settings suggested (Continued)

based on analysis results. The suggestion may be a policy, organization, policy customization, or organization customization.

20 Claims, 19 Drawing Sheets

Related U.S. Application Data

(60) Provisional application No. 62/440,934, filed on Dec. 30, 2016.

(51) Int. Cl.
*G06F 21/60* (2013.01)
*G06Q 10/10* (2012.01)
*H04L 29/06* (2006.01)

(56) References Cited

U.S. PATENT DOCUMENTS

| | | | |
|---|---|---|---|
| 2013/0346294 A1 | 12/2013 | Faith et al. | |
| 2015/0067394 A1* | 3/2015 | Naseh | G06F 11/0793 714/15 |
| 2015/0067761 A1* | 3/2015 | Bade | H04L 63/20 726/1 |
| 2015/0172321 A1* | 6/2015 | Kirti | H04L 63/1416 726/1 |
| 2016/0156671 A1* | 6/2016 | Cabrera | H04L 63/107 726/1 |
| 2017/0041206 A1* | 2/2017 | Maes | H04L 41/5009 |

\* cited by examiner

INTELLIGENCE AND ANALYSIS DRIVEN SECURITY AND COMPLIANCE RECOMMENDATIONS

CROSS-REFERENCE TO RELATED APPLICATION

This application is a continuation of U.S. patent application No. 15/462,466, filed Mar. 17, 2017, which claims the benefit under 35 U.S.C. § 119(e) of U.S. Patent Application No. 62/440,934 filed on Dec. 30, 2016. These previously-filed applications are herein incorporated by reference in their entirety.

BACKGROUND

Hosted services provided by tenants of service providers to their users, such as companies to their employees or organizations to their members, are an increasingly common software usage model. Hosted services cover a wide range of software applications and systems from cloud storage to productivity, and collaboration to communication. Thus, any number of users may utilize applications provided under a hosted service umbrella in generating, processing, storing, and collaborating on documents and other data.

The usage of such hosted services and handling of data may be subject to regulatory, legal, industry, and other rules. Depending on the particular service, handled data, organization type, and many other factors, different rules may be applicable. Thus, it is a challenging endeavor for system administrators to determine applicable policies and configurations for their organization, configure systems, and implement the applicable policies and configurations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to intelligence and analysis driven security and compliance suggestions. A security and compliance module associated with a hosted service may be configured to analyze a tenant's environment, such as numbers and types of users, employed service components, processed and stored documents, and data. Based on the analysis, the security and compliance module may suggest a policy or a configuration change to be implemented based on the analysis, which may be presented to the tenant through a dashboard. The suggested policy or configuration may encompass regulatory, legal, industrial, internal compliance, external compliance, and other security and compliance rules or standards employed to protect the tenant, for example. The suggested policy or configuration may be presented along with the analysis results and a prompt to confirm implementation of the suggested policy or configuration. Upon receiving a confirmation of the implementation of the suggested policy or configuration, an option may be presented to customize the suggested policy or configuration by modifying the settings suggested based on analysis results.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
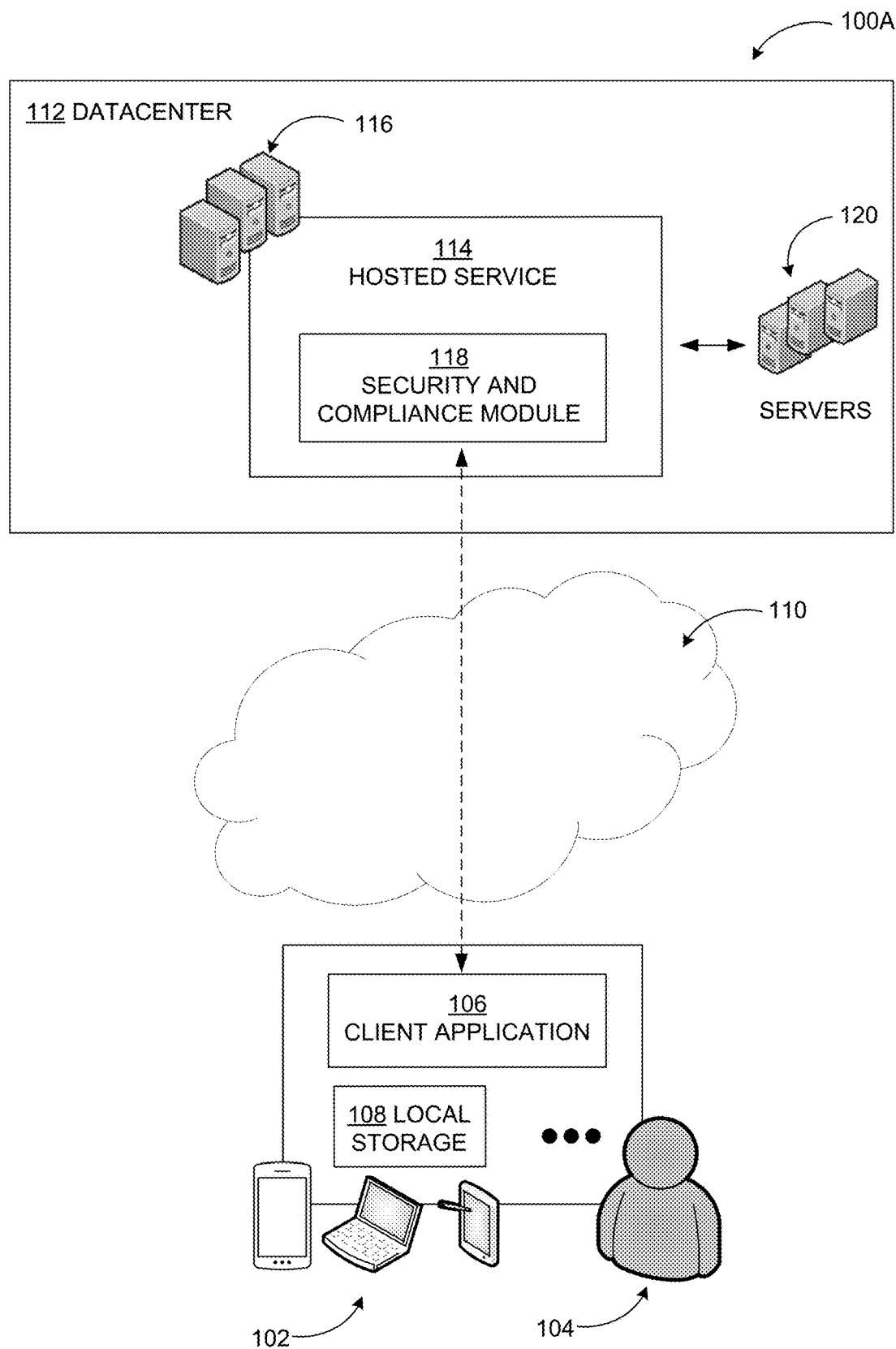
FIGS. 1A through 1C include display diagrams illustrating an example network environment where a system to provide intelligence and analysis driven security and compliance suggestions may be implemented.

As briefly described above, embodiments are directed to intelligence and analysis driven security and compliance suggestions. In some examples, a security and compliance module associated with a hosted service and/or a separate protection service may aggregate and analyze data, metadata, and activities associated with the hosted service in order to detect patterns and derive insights for applicable policies and/or configurations based on the pattern from which a suggestion comprising a policy and/or configuration may be generated. The policy or configuration may be tailored based on a tenant profile, where the tenant profile includes an industry, a size, a geographical location, a hosted service ecosystem, a role, a regulatory requirement, and/or a legal requirement associated with the tenant. The policy or configuration may be related to regulatory, legal, industrial, internal compliance, external compliance, and other security and compliance rules or standards employed to protect the tenant's information, for example. The suggestion may be presented to the tenant through a dashboard, and implemented upon receipt of a confirmation. The suggestion may be presented along with the analysis results and a prompt to confirm implementation of the policy or configuration. Upon receiving a confirmation of the implementation of the suggestion, an option may be presented to customize the policy or configuration by modifying the settings suggested based on analysis results. In other embodiments, the policy or configuration may be automatically implemented. Once implemented, the policy or configuration may be monitored to determine an effectiveness of its performance in protecting data within the tenant's service environment. A performance report may be created based on the monitoring that is analyzed in order to determine suggested policy or configuration updates.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing intelligence and analysis driven security and compliance suggestions. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
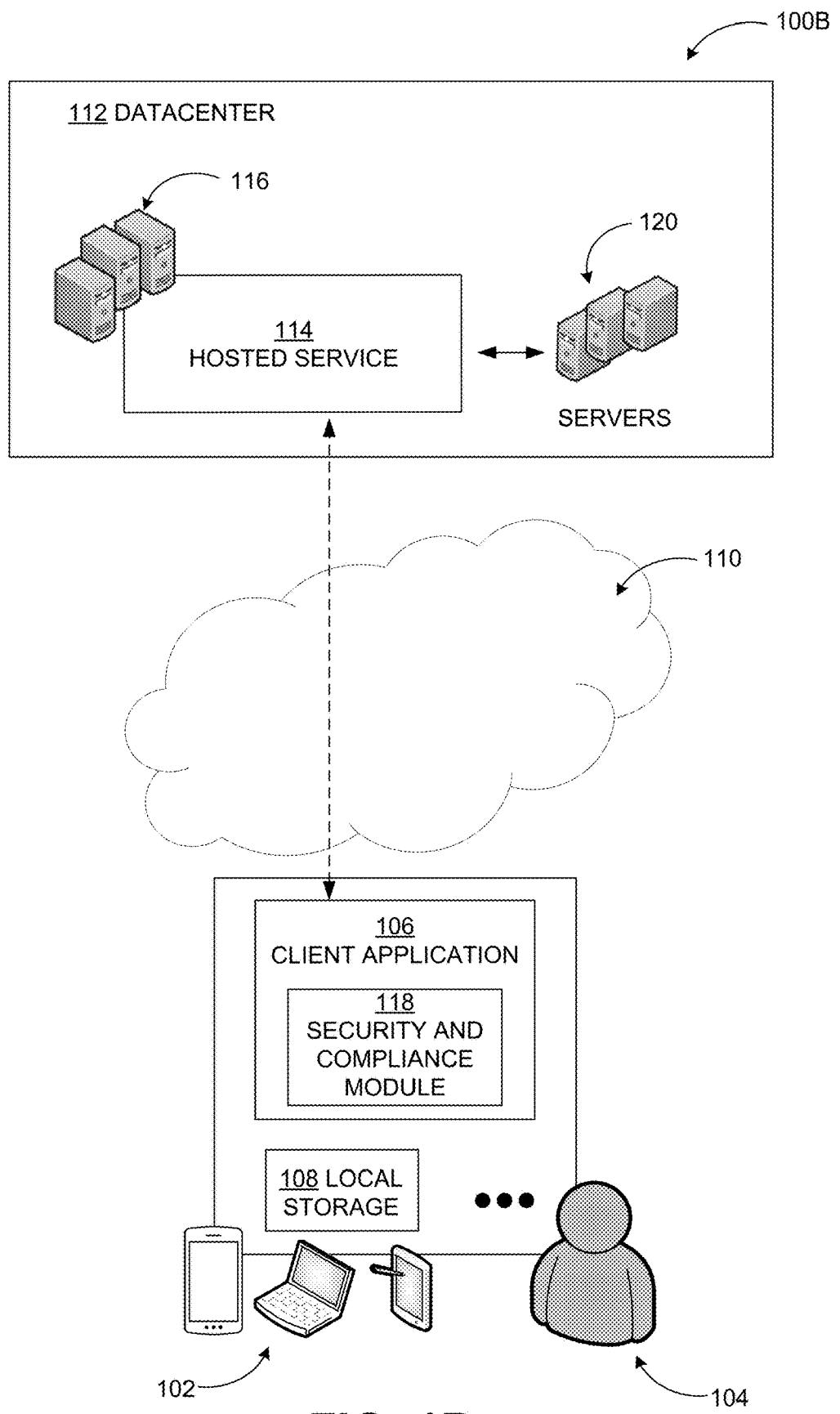
Figure 1C:
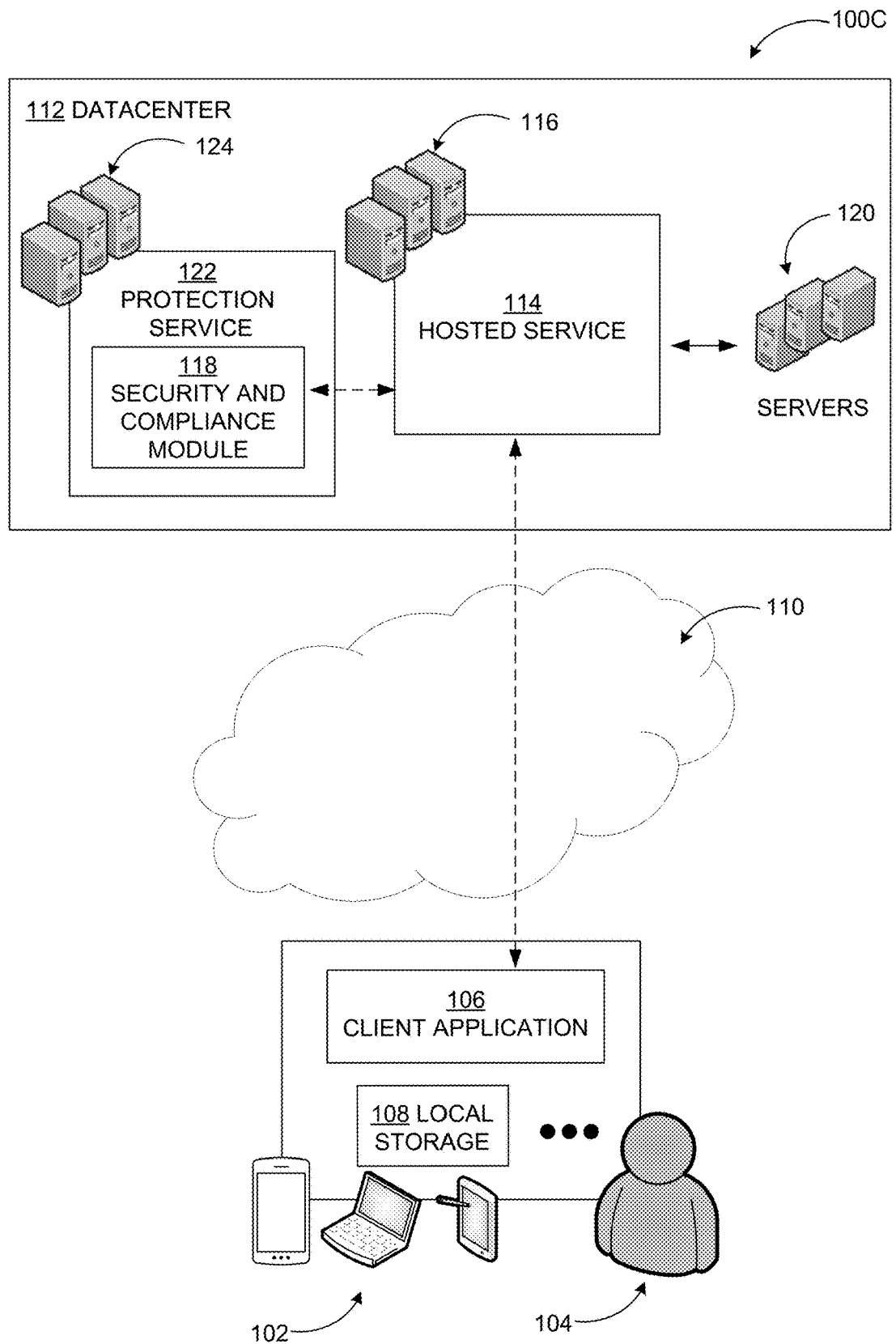

FIG. 1A through 1C include display diagrams illustrating an example network environment where a system to provide intelligence and analysis driven security and compliance suggestions may be implemented.

As illustrated in diagrams 100A-100C, an example system may include a datacenter 112 executing a hosted service 114 on at least one processing server 116, which may provide productivity, communication, cloud storage, collaboration, and comparable services to users in conjunction with other servers 120, for example. The hosted service 114 may further include scheduling services, online conferencing services, and comparable ones. The hosted service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users.

In one embodiment, as illustrated in diagram 100A, the processing server 116 may be operable to execute a security and compliance module 118 of the hosted service 114, where the security and compliance module 118 may be integrated with the hosted service 114. In another embodiment, as illustrated in diagram 100B, the client application 106 may be operable to execute the security and compliance module 118, where the security and compliance module 118 may be integrated with the client application 106. In a further embodiment, as illustrated in diagram 100C, the security and compliance module 118 may be integrated with a separate protection service 122 and executed by one or more processing servers 124 of the protection service 122. The protection service 122 may be configured to serve the hosted service 114 and/or multiple applications associated with the hosted service 114, such as the client application 106. Furthermore, the protection service 122 may provide its services to multiple hosted services. Thus, if a tenant subscribes to multiple hosted services, common information (e.g., analysis results, user profiles, data and metadata) may be used to coordinate suggested policies and configurations reducing duplication of policy implementation burden on the administrators. As described herein, the hosted service 114, the security and compliance module 118, and the protection service 122 may be implemented as software, hardware, or combinations thereof.

The security and compliance module 118 may be configured to manage protection aspects of the tenant's service environment such as malicious attack mitigation, data governance (e.g., based on legal and regulatory requirements), and policy configuration and enforcement. In one scenario, the client application 106 may provide access to a user interface associated with the security and compliance module 118 of the hosted service 114 (or of the protection service 122), such as a dashboard, that may provide summary and/or detailed information associated with threats, security and compliance configurations, analyses results, and configuration controls. The user interface may be used by a system administrator 104 to manage the tenant's security and compliance matters in conjunction with the hosted service 114.

The security and compliance module 118 may be configured to analyze a tenant's environment such as numbers and types of users, employed service components, and processed and stored documents and data. Based on the analysis, the security and compliance module 118 may suggest a policy or configuration to be implemented, where the suggestion may be presented through the dashboard. In some embodiments, the suggestion may be to customize or update a currently implemented policy or configuration. The suggestion may encompass regulatory, legal, industrial, internal compliance, external compliance, and other security and compliance rules or standards employed to protect the tenant, for example. The suggestion may be presented for tenant selection through the dashboard along with analysis results showing reasons and/or potential protection results to encourage proactive as well as reactive creation of the policy or configuration.

Upon receiving a confirmation to implement the suggestion, the security and compliance module 118 may present an option to customize the policy or configuration by modifying the settings suggested based on analysis results. Alternatively, the suggestion and/or customized option may be implemented automatically. The suggested policy or configuration may be stored remotely in a data store associated with the hosted service 114 or protection service 122 (for example, at a storage server within the other servers 120) and/or locally on the client devices 102 (for example, at local storage 108) associated with the administrator 104. In some embodiments, in addition to the suggested policy or configuration, the security and compliance module 118 may be configured to provide other security and compliance suggestions based on the analysis, such as alert generation and management, tenant configuration changes, profile generation, and user interface customization.

As previously discussed, hosted services provided by tenants of service providers to their users are an increasingly common software usage model because it allows any number of users to utilize applications provided under the hosted service umbrella in generating, processing, storing, and collaborating on documents and other data. The usage of hosted services and handling of data may be subject to regulatory, legal, industry, and other rules, where different rules are applicable depending on the particular hosted service, handled data, organization type, and many other factors. Thus, it is a challenging endeavor for system administrators to determine applicable policies and rules for their organization, configure systems, and implement the applicable policies and rules. Implementation of intelligence and analysis driven policy suggestions as described herein may allow tenants of a hosted service to determine their security and compliance needs, configure their systems, implement new policies, and customize user interfaces in an efficient manner. By determining proper policies and configurations automatically, processing and network capacity may be preserved, data security may be enhanced, usability may be improved, and user interactivity may be increased.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large numbers of devices and users using hosted services.

Figure 2:
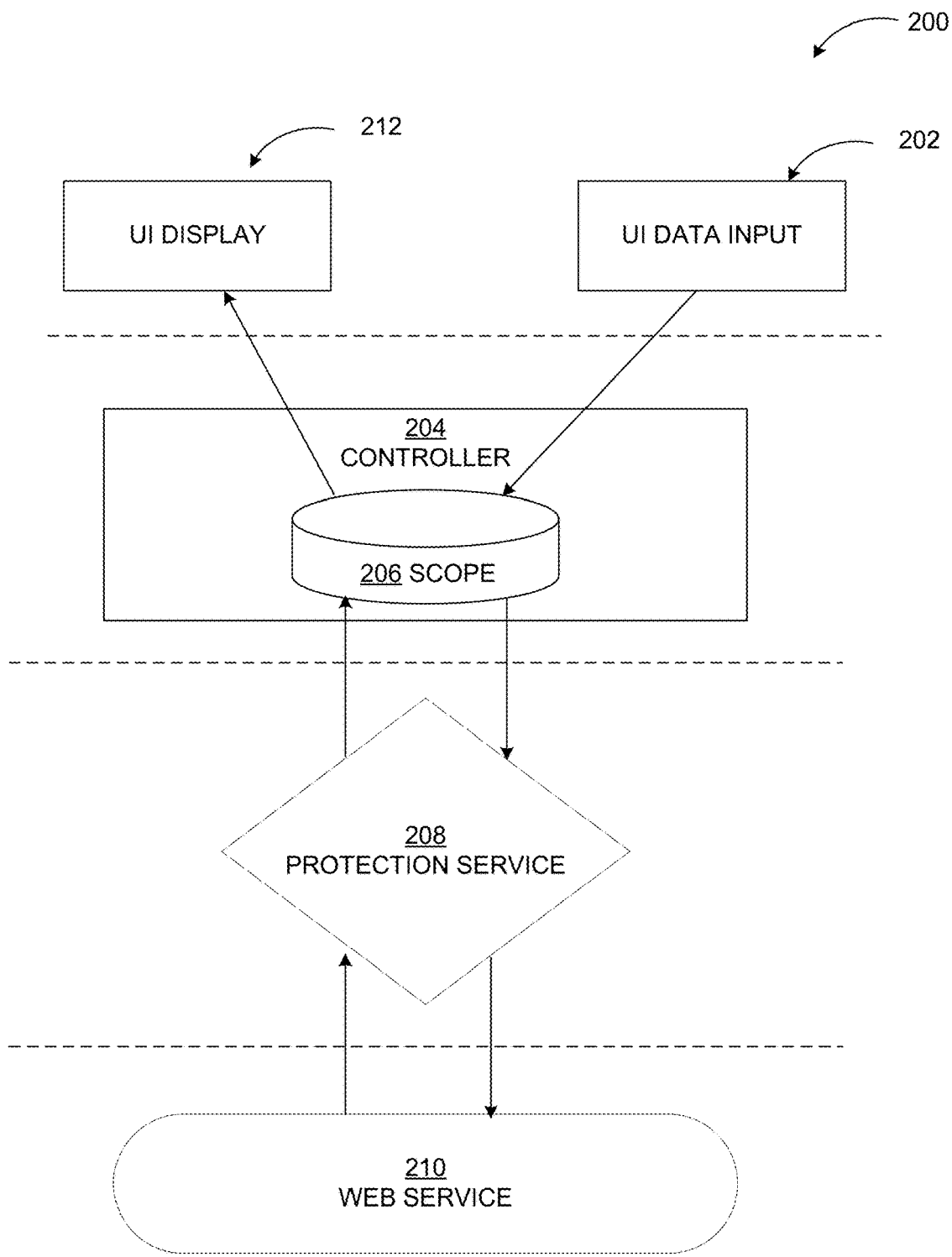
FIG. 2 includes a display diagram illustrating an example architecture of a system to use data input from a user interface to provide customized intelligence and analysis driven security and compliance suggestions for display through the user interface.

FIG. 2 includes a display diagram illustrating an example architecture of a system to use data input from a user interface to provide customized intelligence and analysis driven security and compliance suggestions for display through the user interface.

As shown in a diagram 200, a hosted service may allow access to its services through a client application configured to, among other things, provide a user interface for display. The user interface may enable a tenant, administrator, or other user to interact with an action center associated with protection aspects of a system or organization, such as malicious attack mitigation, data protection, and policy configuration and enforcement, for example.

A controller 204 associated with the user interface may collect user interface data input 202 to create a scope 206 of custom intelligence and analysis driven security and compliance suggestions that may be displayed. The controller 204 may interface with a protection service 208, which can create the suggestions based on the scope 206. The protection service 208 may interface with a web service 210 in order to obtain additional data and/or profiles, such as a tenant profile to create the suggestions. The web service 210 may include backend storage systems, such as tenant storage and general storage, from which the additional data and/or profiles may be retrieved. The controller 204 may provide the created suggestions, customized based on the scope 206, for user interface display 212.

Figure 3:
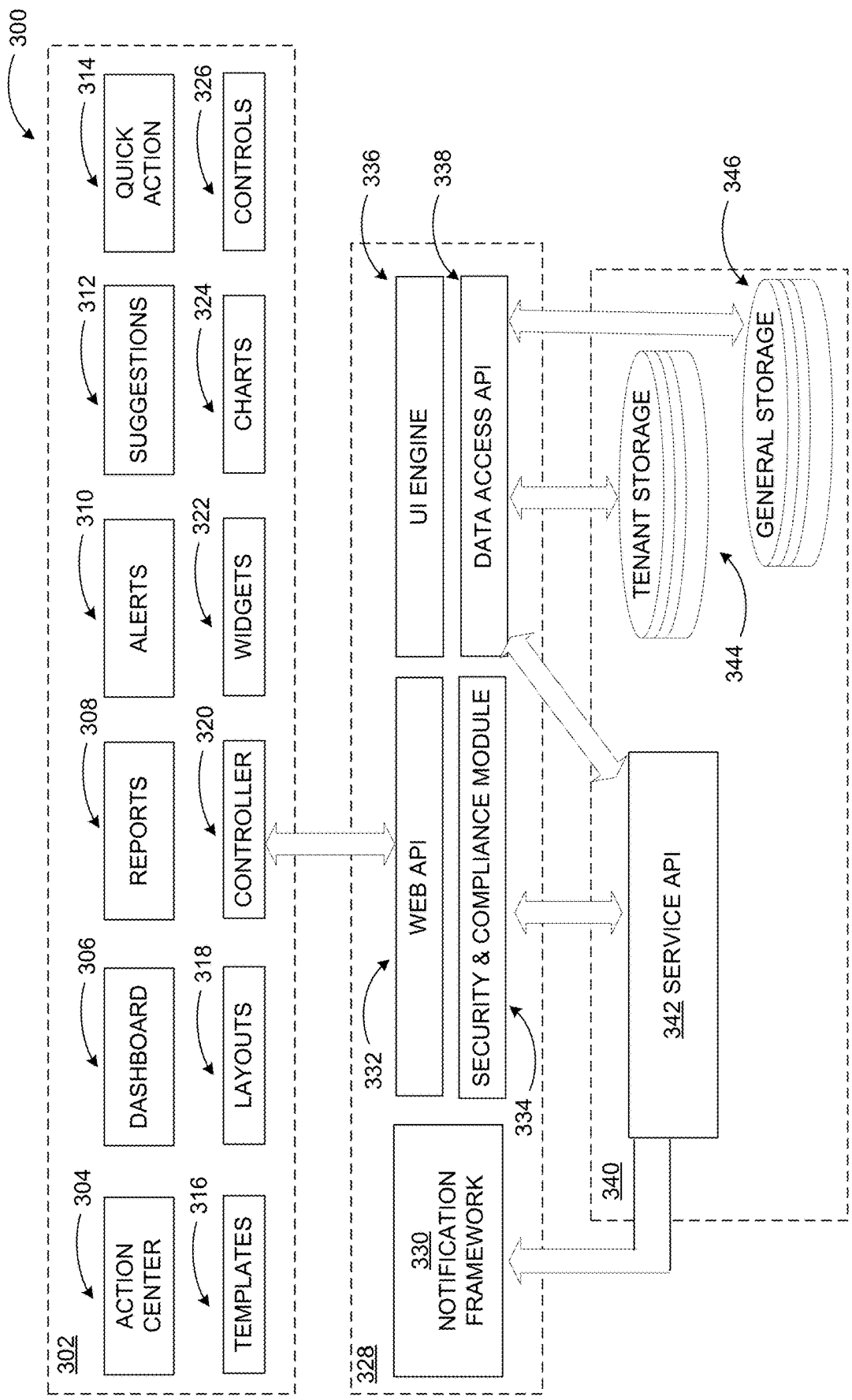
FIG. 3 includes a display diagram illustrating an example architecture of a system to provide intelligence and analysis driven security and compliance suggestions for implementation.

FIG. 3 includes a display diagram illustrating example architecture of a system to provide intelligence and analysis driven security and compliance suggestions for implementation.

In some examples, a hosted service may allow access to its services through a client application 302. As shown in a diagram 300, the client application 302 may display a user interface enabling a tenant, administrator, or user to interact with an action center 304 associated with protection aspects of a system or organization, such as malicious attack mitigation, data protection, and policy configuration and enforcement, for example. The user interface may be a dashboard 306, where data input from the dashboard 306 may be used to provide customized suggestions 312 for display through the dashboard 306. The suggestions 312 may include a policy, a configuration, a policy customization, or a configuration customization to protect, for example. The dashboard 306 may also provide reports 308, alerts 310, and quick action options 314 with which the tenant, administrator, or user may interact. The dashboard 306 may have attributes such as templates 316, layouts 318, widgets 322, charts 324 and controls 326 that may be customized.

A dashboard controller 320 may interface with a server 328 through a web application programming interface (API) 332. Calls may be sent back and forth from the server 328 to the client application 302 based on what should be displayed through the dashboard 306. For example, a security and compliance module 334 may generate the suggestions 312 and a call may sent through the web API 332 to display the suggestions 312 through the dashboard 306 in a manner determined by the user interface (UI) engine 336. The server 328 may host a notification framework 330 configured to determine tenants, administrators, and/or users to be notified of policy suggestions, alerts, and reports, among other examples, and how those notifications should be delivered.

A data access API 338 hosted by the server 328 may interface with backend storage systems 340. The backend storage systems 340 may include tenant storage 344 and general storage 346, for example. The backend storage systems 340 may also include a service API 342 that interfaces with the security and compliance module 334, the notification framework 330, and data that is being retrieved by the data access API 338 from the tenant storage 344 and general storage 346 to allow exchange.

Figure 4:
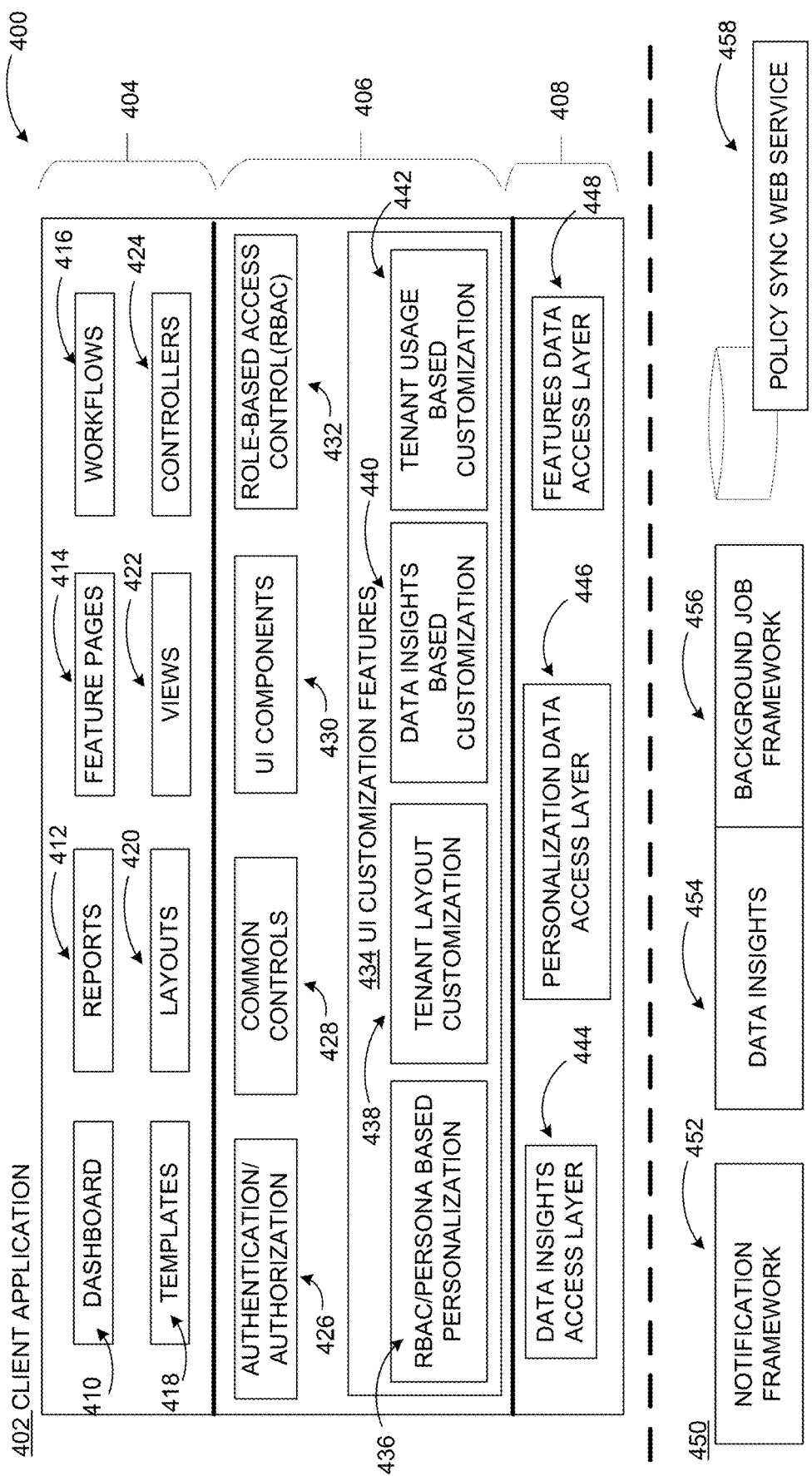
FIG. 4 includes a display diagram illustrating another example architecture of a system to provide customization and alert management after a security and compliance suggestion has been implemented.

FIG. 4 includes a display diagram illustrating another example architecture of a system to provide customization and alert management after a security and compliance suggestion has been implemented.

In some examples, a hosted service may allow access to its services through a client application 402 comprising various layers. As shown in a diagram 400, a first layer 404 may comprise a user interface displayed by the client application 402. The user interface may enable a tenant, administrator, and/or user to interact with an action center associated with protection aspects of a system or organization, such as malicious attack mitigation, data protection, and policy configuration and enforcement, for example. The user interface may be a dashboard 410 that include attributes such as reports 412, feature pages 414, workflows 416, templates 418, layouts 420, views 422, and controllers 424 that may be customized.

A second layer 406 may comprise authentication/authorization features 426, common controls 428, user interface components 430, role-based access controls (RBAC) 432, and user interface (UI) customization features 434 configured to control access to and enable customization of the user interface displayed by client application 402. The UI customization features 434 may be data-driven and include RBAC or persona based personalization 436, tenant layout customization 438, data insights based customization 440, and tenant usage based customization 442. A third layer 408 may include a data insights access layer 444, personalization data access layer 446, and a features data access layer 448 that help to support the UI customization features 434 provided by the second layer 406 to enable access control to and customization of the user interface displayed by the client application 402.

A server 450 may host a notification framework 452, a data insights engine 454, a background job framework 456, and a policy synchronization web service 458. The policy synchronization web service 458 may be configured provide and implement policy or configuration suggestions, and ensure that the policies or configurations once implemented are synchronized with the client application 402. The notification framework 452 may be configured to determine tenants, administrators, and/or users to be notified of policy suggestions, alerts, and reports, among other examples, and how those notifications should be delivered. The data insights engine 454 may in conjunction with the data insights access layer 444 help to support the UI customization features 434 to enable access control to and customization of the user interface displayed by the client application 402. The data insights engine 454 may analyze data from the background job framework 456 to detect a pattern within a tenant's service environment from which it may derive an insight for applicable policies or configurations to generate at least one suggested policy or configuration.

Figure 5:
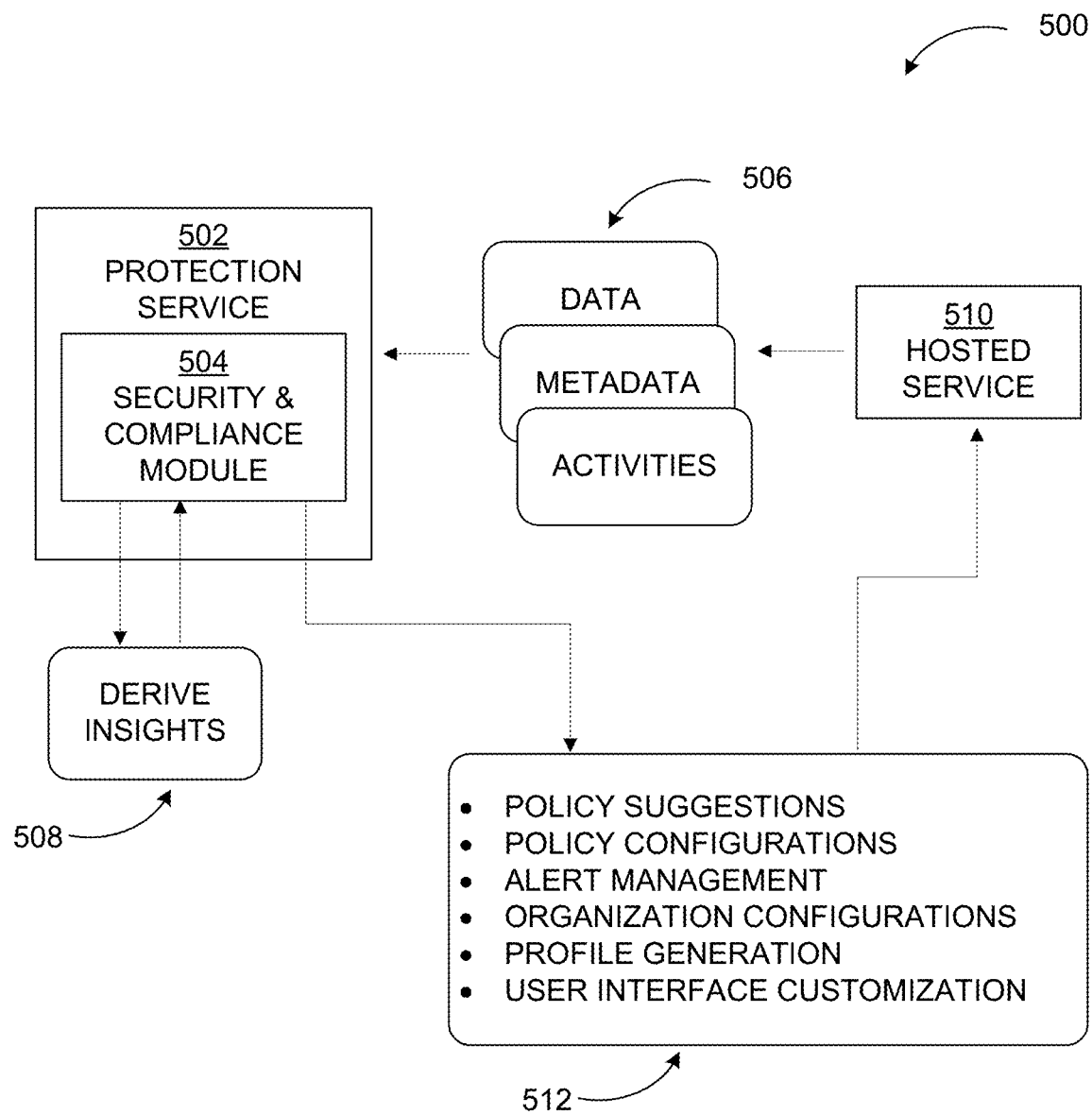
FIG. 5 includes a display diagram illustrating conceptually an example set of actions and components for implementing intelligence and analysis driven security and compliance suggestions.

FIG. 5 includes a display diagram illustrating conceptually an example set of actions and components in implementing intelligence and analysis driven security and compliance suggestions.

As shown in diagram 500, a protection service 502 may retrieve, from a hosted service 510, data, metadata, and activities 506 associated with the hosted service 510. The protection service 502 may include a security and compliance module 504, which may aggregate and analyze the data, metadata, and activities 506 in order to detect patterns to derive insights 508 for applicable policies and/or policy configurations based on the patterns. The derived insights 508 may be used to generate security and compliance suggestions 512 to protect their organization. The security and compliance suggestions 512 may include policy suggestions, policy configurations, alert generation and management, organization configuration changes, profile generation, and user interface customization. The security and compliance suggestions 512 may be further tailored based on a tenant profile, where the tenant profile includes an industry, a size, a geographical location, a hosted service ecosystem, a role, a regulatory requirement, and/or a legal requirement associated with the tenant using the hosted service 510. In some embodiments, these security and compliance suggestions 512 may be implemented automatically.

Additionally, through the analysis of the data, metadata, and activities 506 and the derivation of insights 508, the protection service 502 may manage recommendation visibility, widget availability, recommendation ordering, suggested recommendations, default homepages, widget ordering in a widget library, digest content, auto-pins based on actions, insights in policy flow, automatic policy settings based on insights, customized dashboards, intelligent quick actions, widget content, insights drilldown content, alerts, retention/archiving/data loss prevention (DLP) widgets, recommendation content, and people and content pages.

In some embodiments, a guided cross-scenario compliance workflow may be implemented in the hosted service 510. The guided cross-scenario compliance workflow may allow for creation of multiple actions on a single data set, and guide a user to intelligently define that data set. Comprehensive protection policies that take several actions based on locations, actions, and classification may be implemented. The protection service 502 may thereby manage classifications, intelligent imports, retention policies, DLP policies, alert policies, regulation or legal compliance policies, provision of simple or advanced policy flows, and creation of alerts from a policy.

In other embodiments, pivots such as mailflow data, tenant content, and similar ones may be used to provide rich detection of threats. Automatic detection of and alerting on these threats may be implemented by managing alerts, alert dashboards, recent alerts widgets, people pages, content pages, correlation based alerts, remediation actions on data in line, an editing alert threshold from user interface, creation of an alert from a policy, and creation of an alert based on triggers for each potential alert scenario (e.g., data deleted).

FIGS. 6A through 6D include display diagrams illustrating an example dashboard through which suggestions may be presented, implemented, and monitored. As shown in a diagram 600A of FIG. 6A, a client application may provide an administrator, for example, access to a user interface, such as a dashboard 602, associated with a security and compliance module of the hosted service or a separate protection service. The dashboard 602 may present summary and/or detailed information associated with threats, security and compliance configurations, analyses results, and configuration controls, for example. Among other things, the dashboard 602 may comprise a plurality of tabs 604 that each offer one or more security and compliance-based features that may be managed by the tenant, administrators, and/or users through the dashboard 602. Example tabs 604 may include a home dashboard view 606, an action center, permissions, security policies, data management, data discovery, investigation, reports, service assurances, and administrative consoles.

The home dashboard view 606 may enable the tenant, administrators, and/or users to quickly create, enable, or manage data 608 and security policies 610. Additionally, the home dashboard view 606 may display a suggestion user interface element 612 that includes one or more suggested policies or configurations. In some examples, an icon 614, such as a star, may be associated with the suggestion user interface element 612 to indicate that a new policy or configuration has been suggested since the last time the dashboard 602 was viewed. The suggestion user interface element 612 may convey the level of protection for information within the tenant's service environment graphically and/or textually based on the analysis of the tenant's service environment. As illustrated, a pie chart and accompanying text 616 indicate that 68% or 469, 620 of the documents within the tenant's service environment were not being protected by a currently implemented policy or configuration. The suggestion user interface element 612 may also display analysis results 618, such as the particular type of information not being protected, and a prompt to confirm implementation of a reactive policy 620 to enable protection of the particular type of information. For example, financial data may be detected within the tenant's service environment, and no currently implemented policies or configurations may protect the financial data. Therefore, implementation of a reactive policy to protect the financial data may be suggested. In some embodiments, metadata associated with a tenant profile 622 used to tailor the suggested policy may also be displayed in the suggestion user interface element 612. The metadata associated with the tenant profile 622 may include an industry, a size, a geographical location, a hosted service ecosystem, a role, a regulatory requirement, and/or a legal requirement associated with the tenant. For example, the suggested policy may be tailored based on a tenant's affiliation with the financial industry and its location within the United States.

Figure 6A:
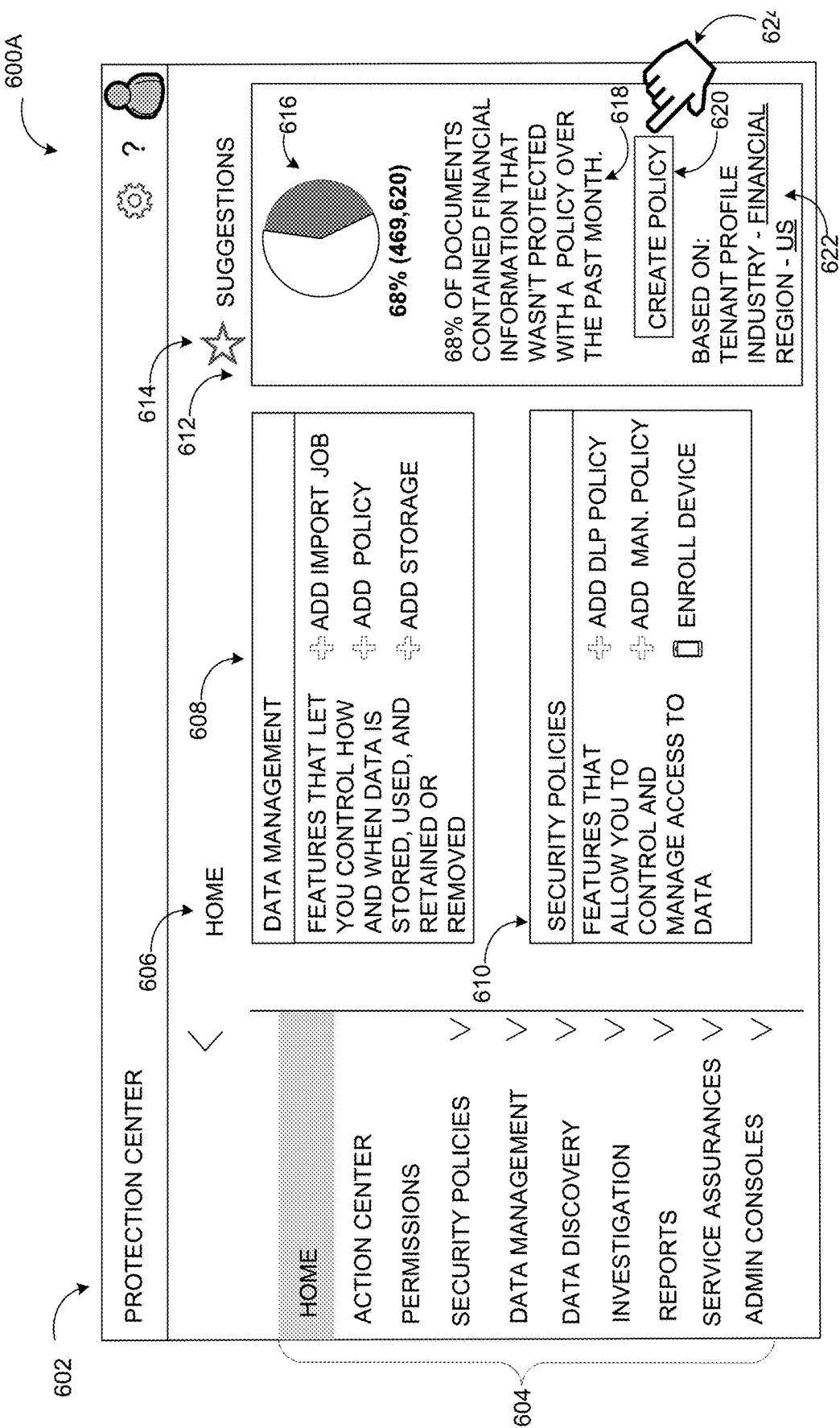
FIGS. 6A through 6D include display diagrams illustrating an example dashboard through which suggestions may be presented, implemented, and monitored.
Figure 6B:
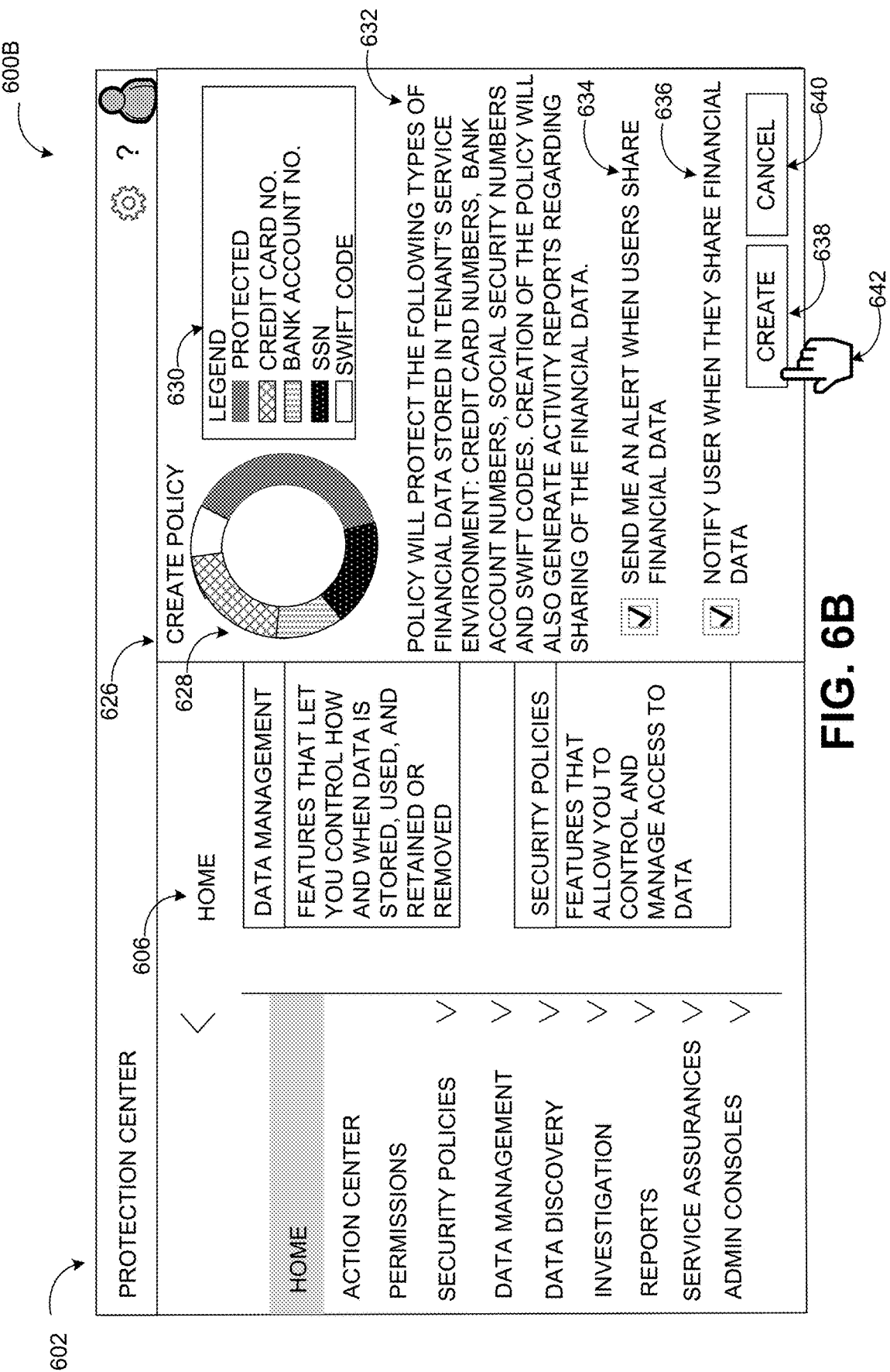

Upon the administrator's selection 624 of the prompt to confirm implementation of the reactive policy 620, a policy creation user interface element 626 may be overlaid on the home dashboard view 606, as shown in diagram 600B of FIG. 6B. The policy creation user interface element 626 may include a more detailed graphical conveyance to show the exact types of financial data within the tenant's service environment that are not protected by currently implemented policies. For example, a more detailed graph 628 and accompanying legend 630 breaks down the types of financial data that are not protected and the amount of each of those unprotected types of financial data proportionate to the total amount of data within the tenant's service environment. As illustrated, the types of financial data that are not protected include credit card numbers, bank account numbers, social security numbers, and SWIFT codes.

The policy creation user interface element 626 may also include a prompt 632 to inform the user about the types of data the policy will protect once implemented, such as the currently unprotected bank account numbers, social security numbers, and SWIFT code, and other features that will be enabled by the policy, such as generation of activity reports. The policy creation user interface element 626 may also include selectable options for alert generation 634 and user notifications 636. For example, the administrator may select an option to be alerted when a user shares a document that contains any financial data and/or to send a notification to that user when they share the document. The administrator may then select a "Create" control element 638 to create and implement the policy or select a "Cancel" control element 640 to prevent the policy from being created and implemented.

Figure 6C:
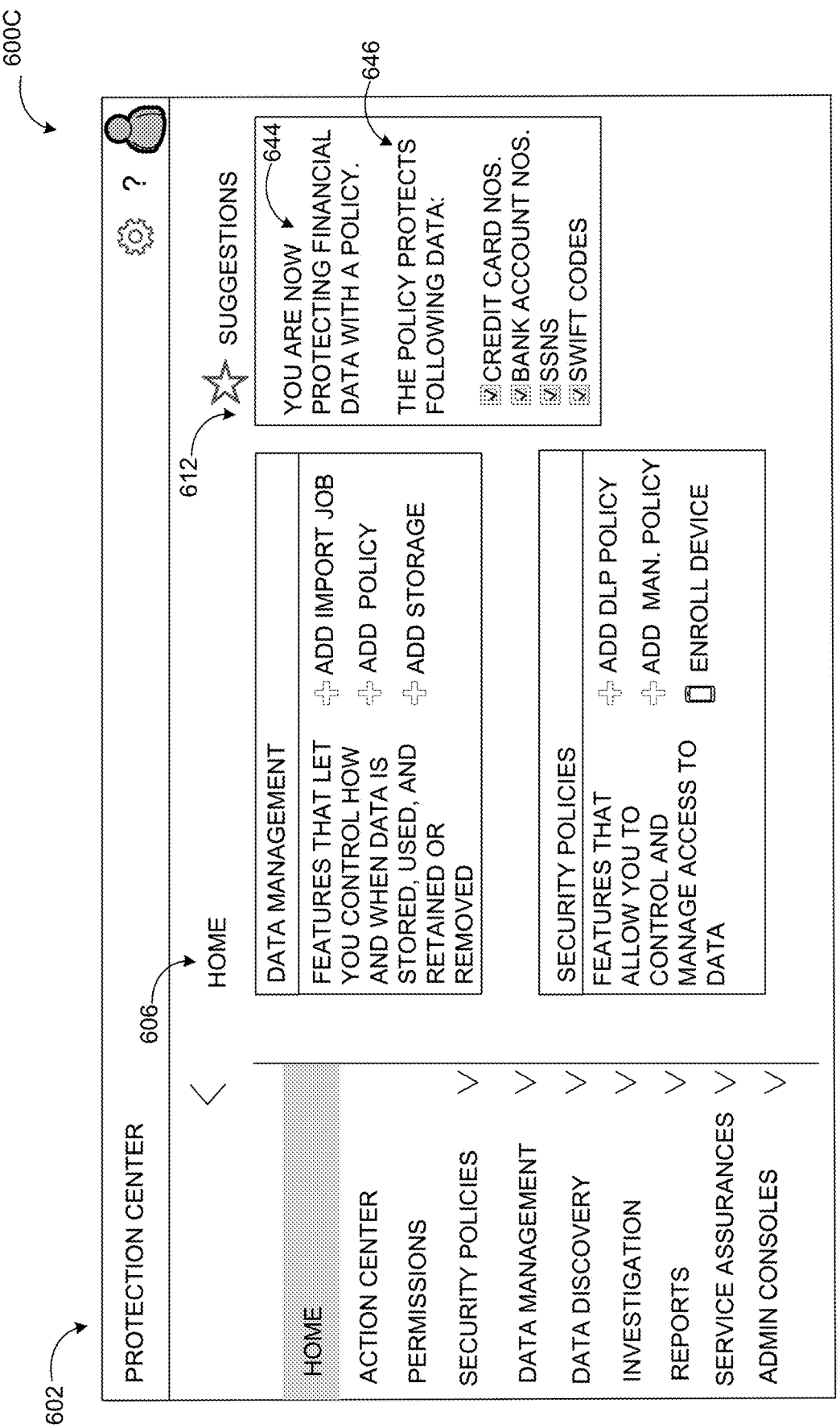
Figure 6D:
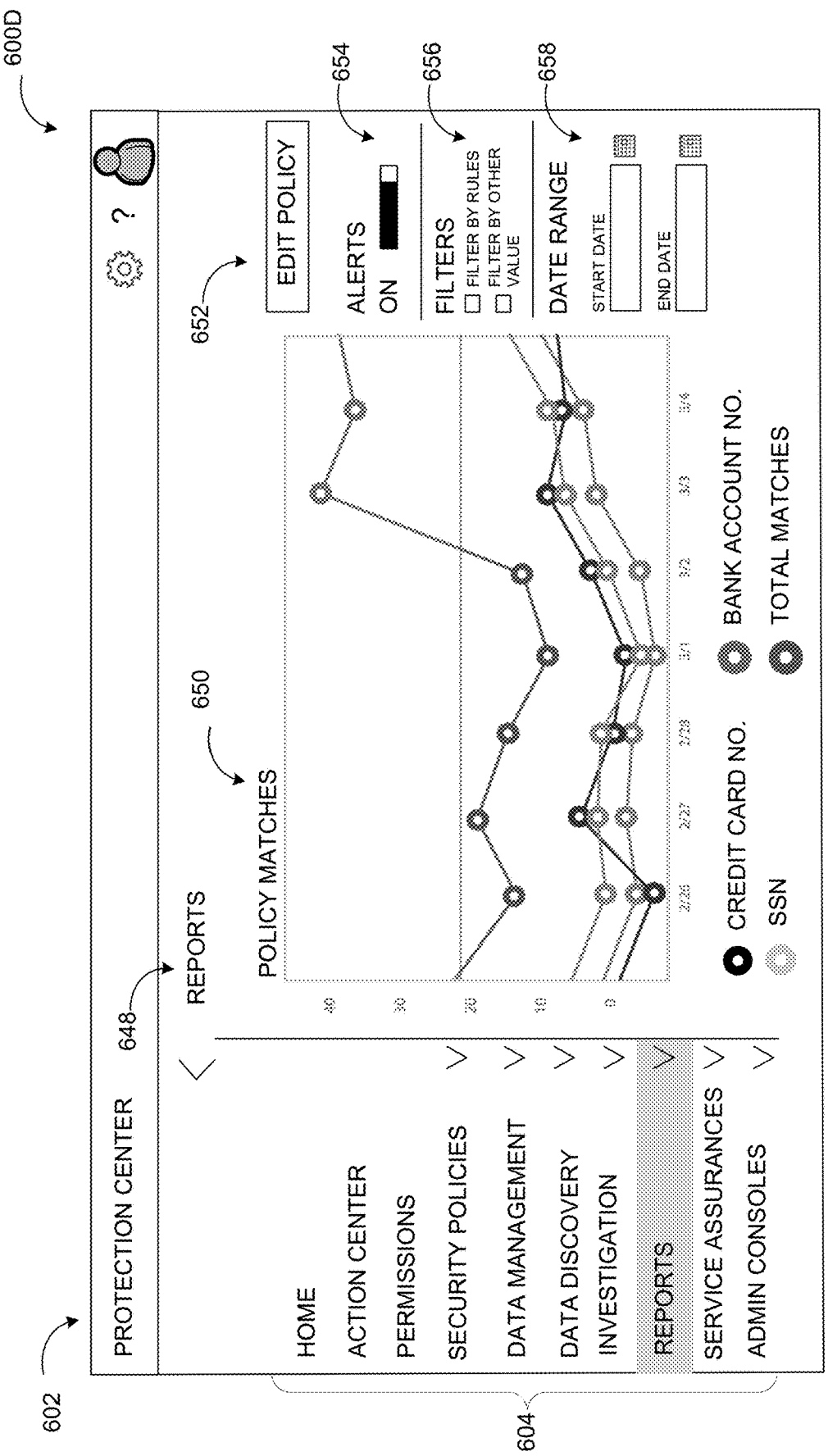

Upon the administrator's selection 642 of the "Create" control element 638, the administrator may be returned to the home dashboard view 606 and the suggestion user interface element 612 may be updated, as illustrated in diagram 600C of FIG. 6C. For example, the suggestion user interface element 612 may include a confirmation prompt 644 to indicate the financial data is now be protected by the created policy. Additionally, the suggestion user interface element 612 may include a list of the particular types of financial data being protected 646, such as credit card numbers, bank account numbers, social security numbers, and SWIFT codes.

Once the policy has been created, the security and compliance module of the hosted service or the separate protection service may be configured to monitor particular types of data that are being created, used, and shared within the tenant's service environment and determine whether the created policy matches, and therefore protects, that data. The monitoring results may be compiled to produce a performance report which may then be provided to the administrator through the dashboard 602, as shown in a diagram 600D of FIG. 6D. Upon administrator selection of the reports feature from the tabs 604, a reports view 648 may be displayed through the dashboard 602. The monitoring results may be presented as a graphical representation of the policy matches 650, which may be visually pleasing and easier to digest by the administrator. The graphical representation of the policy matches 650 may include just a total number of policy matches and/or, as shown, may also break down the matches by particular types of data matching the policy.

The reports view 648 may include an option to edit the policy 652. In some examples, suggestions for updates and/or further customization of the implemented policy or configuration may be determined based on the monitoring results, and displayed if the option to edit the policy 652 is selected. The reports view 648 may also include an option to turn on or off an alerts feature 656 regarding monitoring results associated with the policy. In some embodiments, if the alerts feature 656 is turned on, the administrator may receive an email or other form of message notifying him or her of a strange pattern or trend detected from the monitoring results. For example, the message may indicate that a higher number of policy matches than normal have been detected within the past 24 hours. The message may include a selectable link to the reports view 648, which will include more detailed information about the pattern or trend detected. The reports view 648 may further include filters 656 to customize the graphical representation of the policy matches 650 and a date range 658 from which monitoring results are pooled from to create the graphical representation of the policy matches 650.

The dashboard 602 is not limited to the above described components and features. Various graphical, textual, coloring, shading, and visual effect schemes may be employed to present suggested policies and/or policy configuration options through a dashboard.

Figure 7:
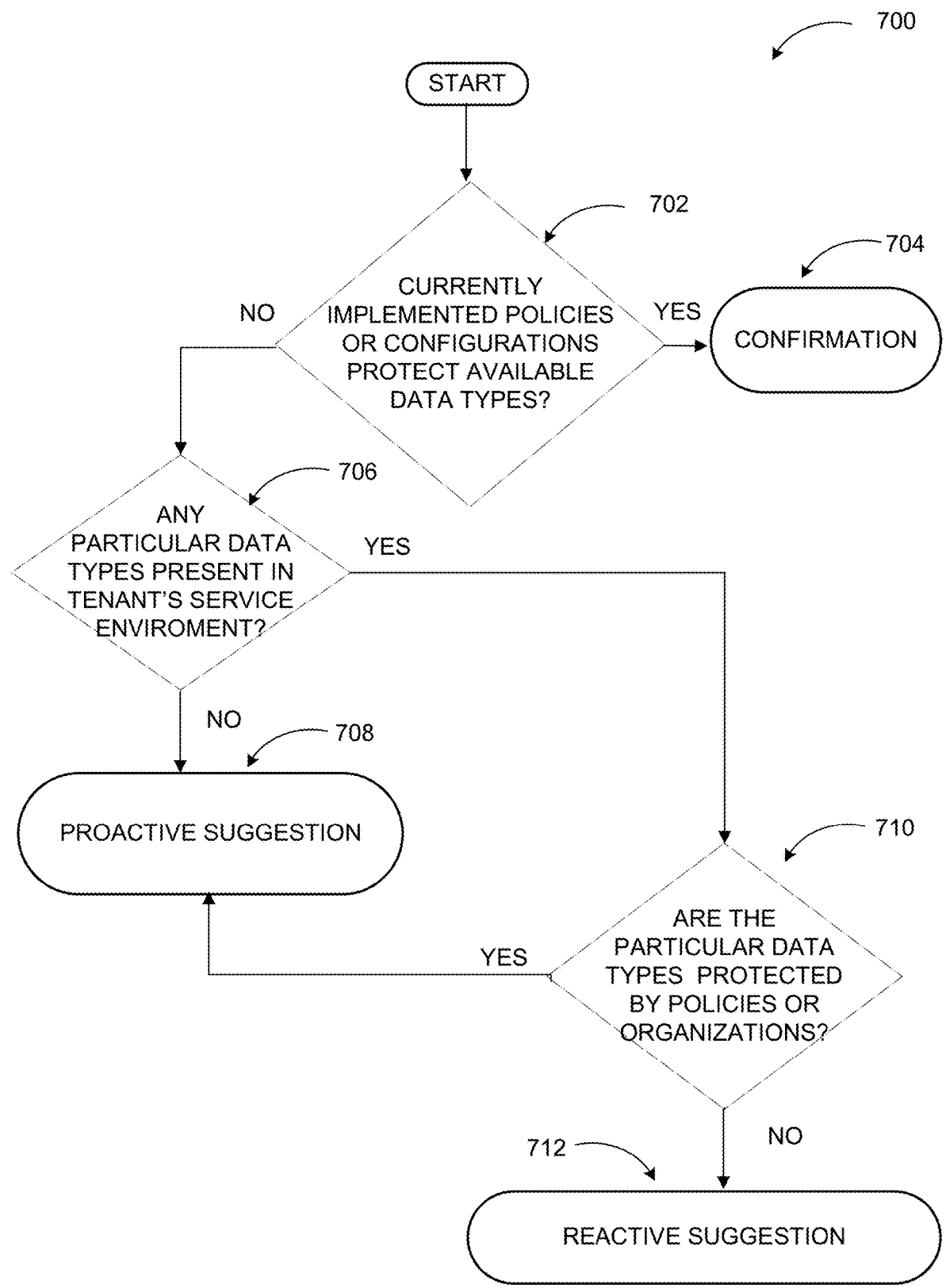
FIG. 7 includes a display diagram illustrating a logic flow diagram for determining a policy or configuration to be suggested to the tenant.
Figure 8A:
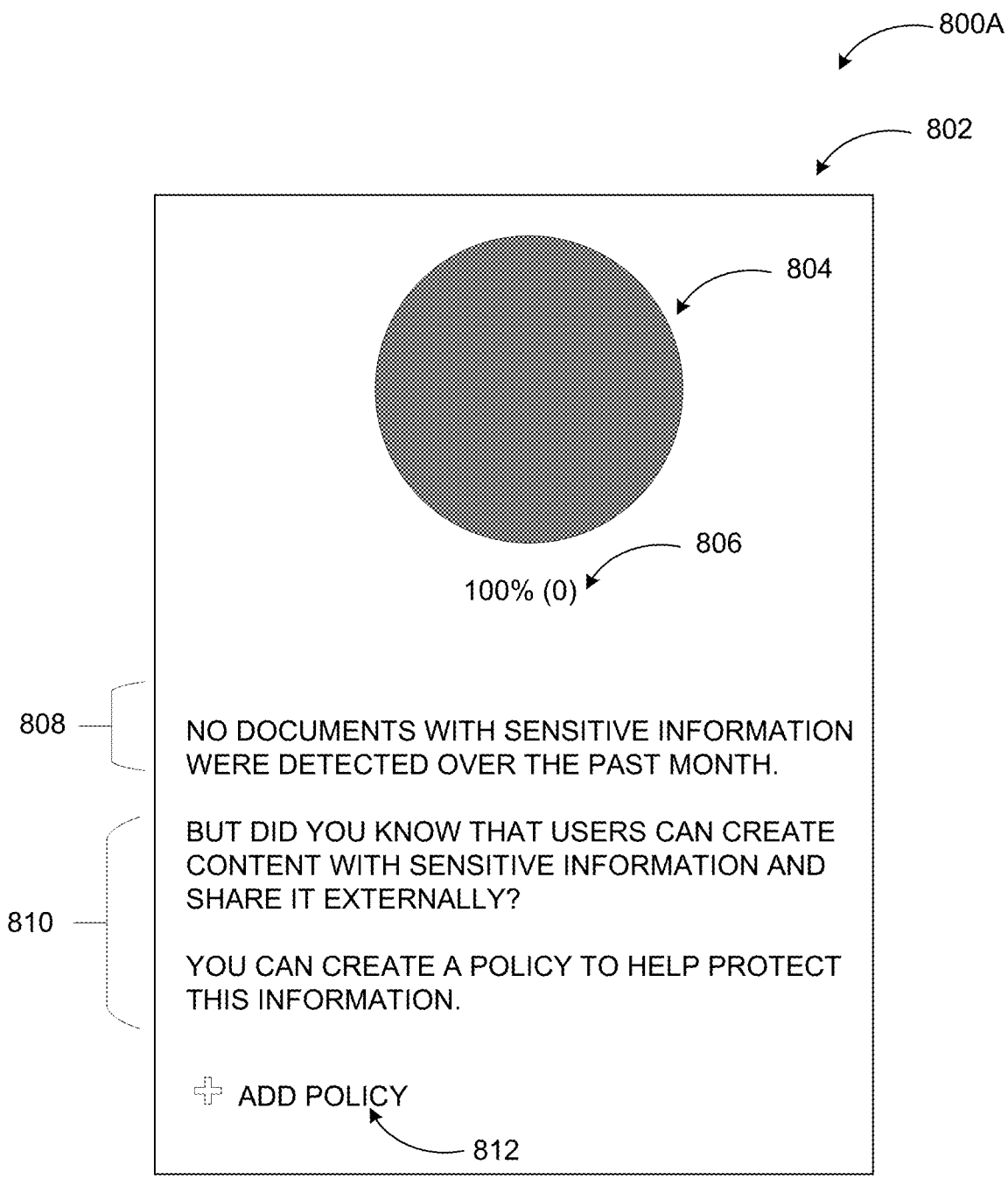
FIGS. 8A through 8D include display diagrams illustrating policy or configuration suggestions presented to the tenant through a dashboard.
Figure 8B:
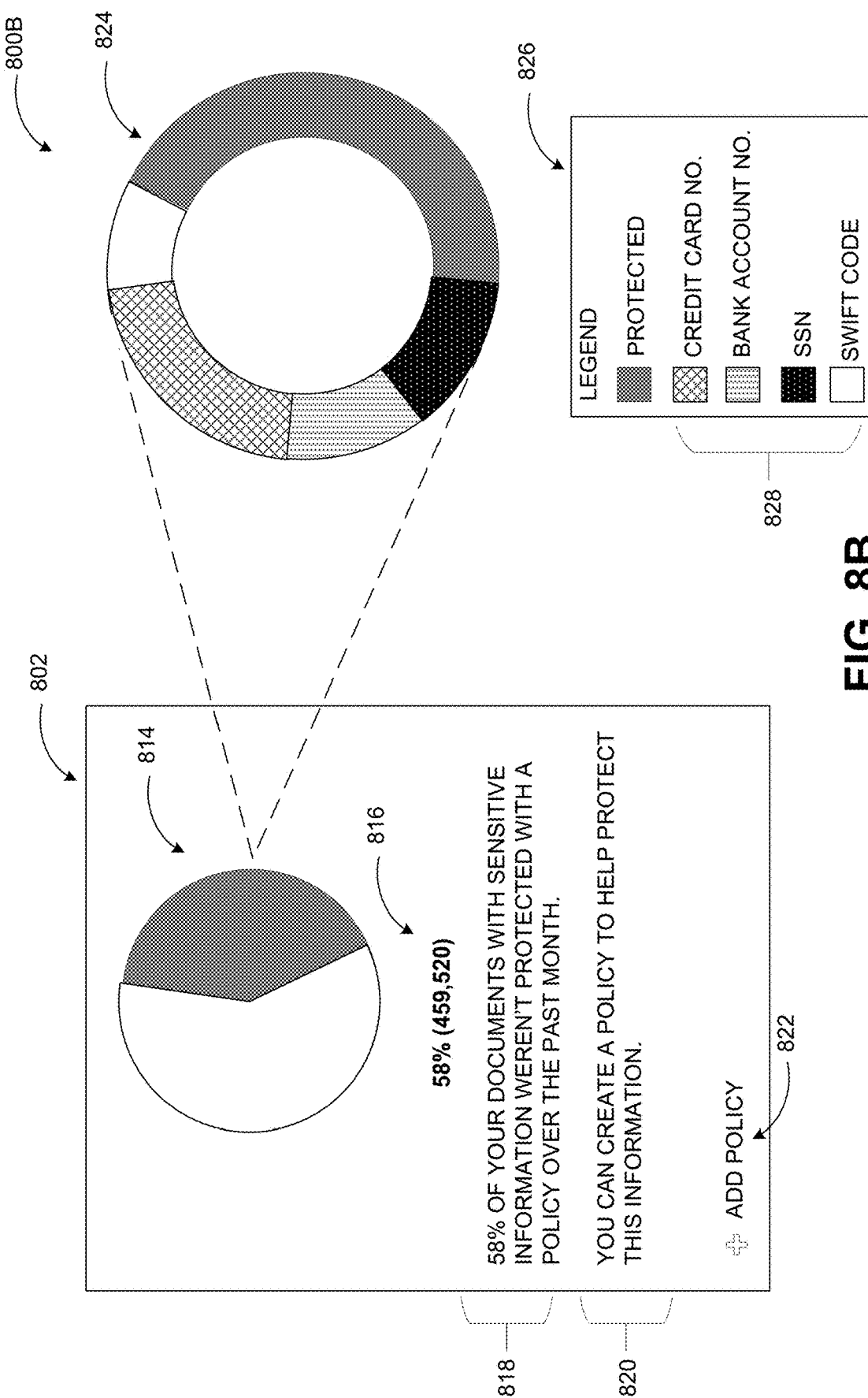
Figure 8C:
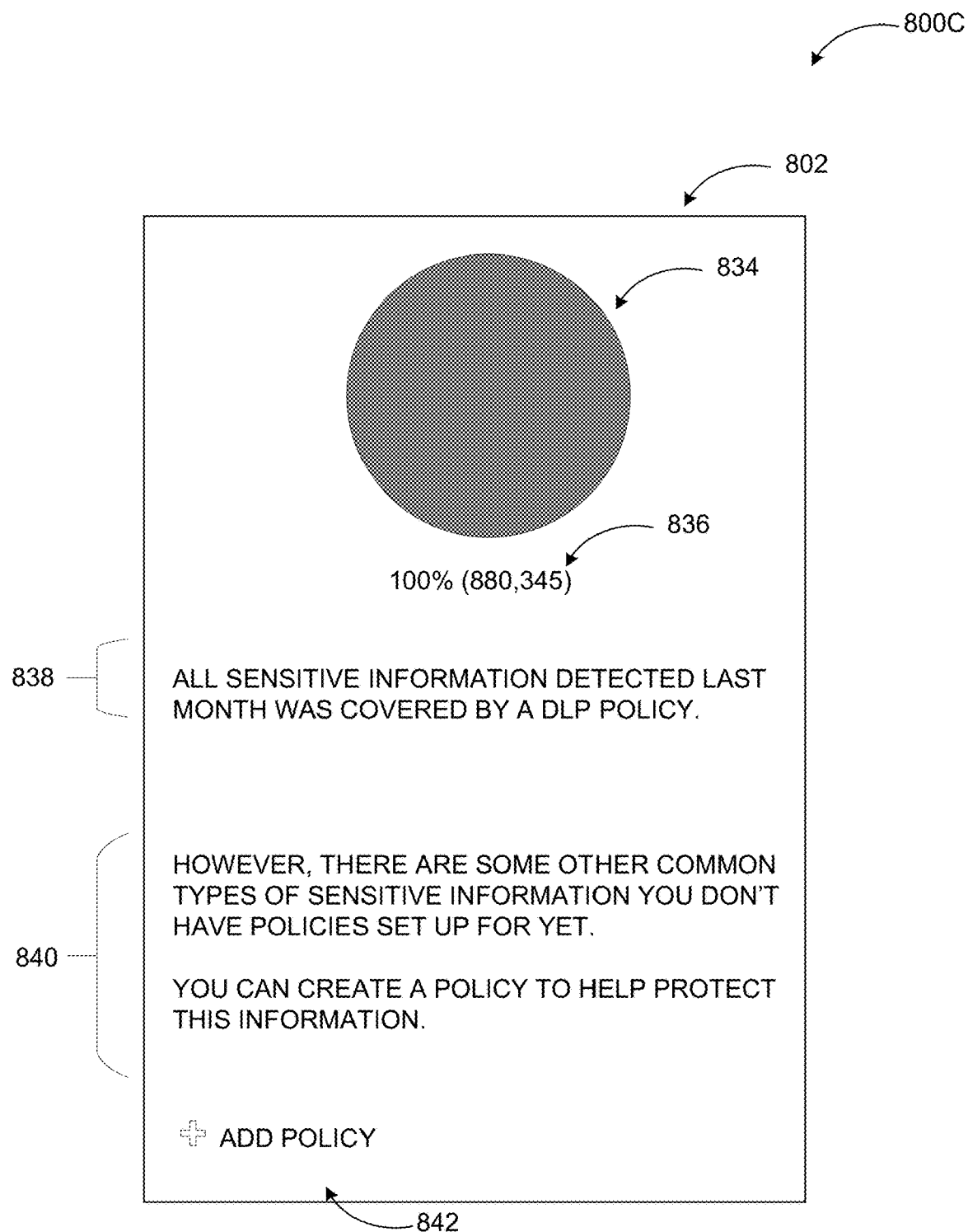
Figure 8D:
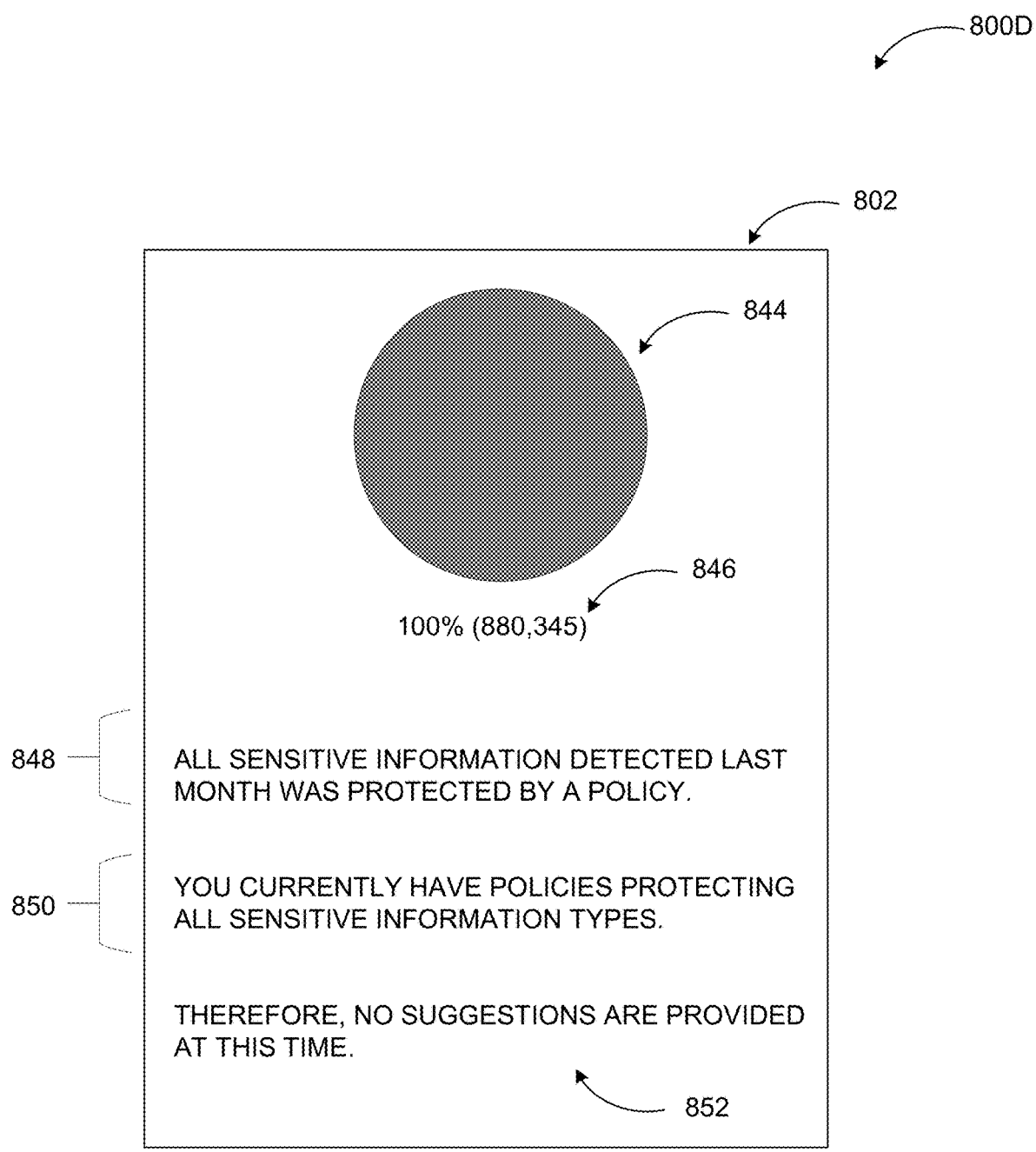

FIG. 7 includes a display diagram illustrating a logic flow diagram for determining a policy or configuration to be suggested to the tenant. As discussed previously, to provide intelligence and analysis driven policy suggestions for a hosted service, a tenant's service environment may be analyzed to determine a need for a policy or configuration change, a suggested policy or configuration may be determined based on the analysis, and the suggested policy or configuration may be presented to the tenant through a dashboard.

As illustrated in diagram 700, to determine the need for a policy or a configuration change, policies and configurations that are being currently implemented by the hosted service may be retrieved to determine whether they include policies or configurations that protect available sensitive information 702. For example, available sensitive information may include confidential data associated with personal information or business information. The confidential data may be financial in nature, including credit card numbers, debit card numbers, bank account numbers, and SWIFT codes, for example. The confidential data may also include private information such as social security numbers, personal health information, and the like. Thus, it may be determined whether or not the currently implemented policies and configurations include protection for each of these types of available sensitive information. If the currently implemented policies and configurations protect the available sensitive information (that is, every type of sensitive information possible), feedback that the currently implemented policies and configurations are sufficient 704 may be provided. No suggested policy will be provided. However, if the currently implemented policies and configurations do not protect the available sensitive information, it may be determined whether any types of sensitive information 706 are within the tenant's service environment.

If no types of sensitive information are detected within the tenant's service environment, a proactive suggestion 708 comprising one or more policies or configurations to protect the types of the available sensitive information that are not protected by the currently implemented policies may be provided. If there is sensitive information detected within the tenant's service environment, it may be determined whether the type(s) of sensitive information detected is/are protected by the currently implemented policies or configurations 710. If the types of sensitive information detected are protected by the currently implemented policies, the proactive suggestion 708 comprising one or more policies or configurations to protect the types of the available sensitive information that are not protected by the currently implemented policies or configurations may be provided. Alternatively, if one or more of the types of sensitive information detected are not protected by the currently implemented policies or configurations, a reactive suggestion 712 comprising one or more policies or configurations to protect those types of sensitive information that are not currently protected may be provided.

In an example scenario, the tenant may be healthcare insurance provider. As a member of the healthcare industry, the tenant must comply with regulatory, legal, and industry rules, such as the Health Insurance Portability and Accountability Act (HIPPA), for example. A majority of data received and stored by the tenant may contain confidential information, such as social security numbers, personal health information, and financial information, among others. An analysis of the tenant's service environment may reveal that the currently implemented policies or organizations do not protect every type of available sensitive information, and while the social security numbers and personal health information are protected, the financial information is not protected. Therefore, a policy or configuration that protects various types of financial information, such as credit card numbers, debit card numbers, and bank account numbers may be suggested for implementation.

FIGS. 8A through 8D include display diagrams illustrating suggested policies or configurations presented to a tenant through a dashboard. As discussed in conjunction with FIG. 6, a tenant's service environment may be analyzed to determine a need for a policy or configuration change and a suggested policy or configuration may be determined based on the analysis. Once determined, the suggested security and compliance policy may be presented to the tenant through a dashboard. As shown in diagrams 800A-800D, the dashboard may include a suggestion user interface element 802 within which the suggested policy or configuration may be displayed. The suggested policy may be displayed along with analysis results and a prompt to confirm implementation of the suggested policy or configuration.

In a first example scenario, as illustrated by diagram 800A, the analysis of the tenant's service environment may reveal that currently implemented policies or configurations do not protect every type of available sensitive information, but no types of sensitive information are detected within the tenant's service environment. Thus, a presented suggestion 810 may be proactive offering one or more policies to be implemented in order to protect a type of sensitive information that could be potentially stored in the tenant's service environment and is not yet protected by the currently implemented policies or configurations. The suggestion user interface element 802 may convey the level of protection for information within the tenant's service environment graphically 804 and/or textually 806 and provide an explanation of the analysis results 810. In this example, there was no sensitive information within the tenant's service environment detected, and thus by default the information within the tenant's service environment is 100% protected. The suggestion user interface element 802 may also include a prompt 812 to confirm implementation of the suggestion 810.

In a second example scenario, as illustrated by diagram 800B, the analysis of the tenant's service environment may reveal that currently implemented policies or configurations do not protect available sensitive information, and there are types of sensitive information detected within the tenant's service environment that are unprotected. Thus, the suggestion 820 may include one or more policies to protect the types of sensitive information detected that are not protected by the currently implemented policies or configurations. The suggestion user interface element 802 may convey the level of protection for information within the tenant's service environment graphically 814 and/or textually 816 and provide an explanation of the analysis results 818. In this example, there was sensitive information detected within the tenant's service environment, and of that sensitive information, 58% of that sensitive information was not protected by the currently implemented policies. The suggestion user interface element 802 may also include a prompt 822 to confirm implementation of the suggestion 820.

In some embodiments, the graphical and/or textual conveyance of protection levels may be more detailed to show the exact types of sensitive information within the tenant's service environment that are not protected by currently implemented policies. For example, the graph 824 and accompanying legend 826 breaks down the types of sensitive information that are not protected 828 and the percentage of each of those unprotected types of sensitive information within the total amount of information within the tenant's service environment. As illustrated, the types of sensitive information that are not protected 828 include credit card numbers, bank account numbers, social security numbers, and SWIFT codes.

In a third example scenario, as illustrated by diagram 800C, the analysis of the tenant's service environment may reveal that currently implemented policies or organizations do not protect the available sensitive information, but each of the types of sensitive information detected within the tenant's service environment were protected by a currently implemented policy or organization. Thus, a suggested policy 840 may be proactive, offering one or more policies to be implemented in order to protect a type of sensitive information that could be potentially stored in the tenant's service environment and is not yet protected by the currently implemented policies. The suggestion user interface element 802 may convey the level of protection for information within the tenant's service environment graphically 834 and/or textually 836 and provide an explanation of the analysis results 838. In this example, each type of sensitive information detected within the tenant's service environment was protected by a policy, and thus the sensitive information is 100% protected. The suggestion user interface element 802 may also include a prompt 842 to confirm implementation of the suggested policies in addition to the policy suggestion 840.

In a fourth example scenario, as illustrated, by diagram 800D, the analysis of the tenant's service environment may reveal that the currently implemented policies or configurations protect the available sensitive information (that is, there are policies or configurations already implemented for every type of sensitive information possible), and thus feedback that the currently implemented policies or organizations are sufficient may be provided. No suggested policy may be provided. The suggestion user interface element 802 may convey the level of protection for information within the tenant's service environment graphically 844 and/or textually 846 and provide an explanation of the analysis results 848. In this example, policies or configurations are currently implemented for every type of available sensitive information as conveyed by explanation 850, and thus any type of sensitive information that is within the tenant's service environment is 100% protected. The suggestion user interface element 802 may also include a prompt 852 to indicate no policies or configurations are suggested at this time based on the fact that every type of available sensitive information is already protected by a currently implemented policy or configuration.

The examples provided in FIGS. 1A through 8D are illustrated with specific systems, services, applications, modules, and displays. Embodiments are not limited to environments according to these examples. Intelligence and analysis driven policy suggestions may be implemented in environments employing fewer or additional systems, services, applications, modules, and displays. Furthermore, the example systems, services, applications, modules, and notifications shown in FIG. 1A through 8D may be implemented in a similar manner with other user interface or action flow sequences using the principles described herein.

Figure 9:
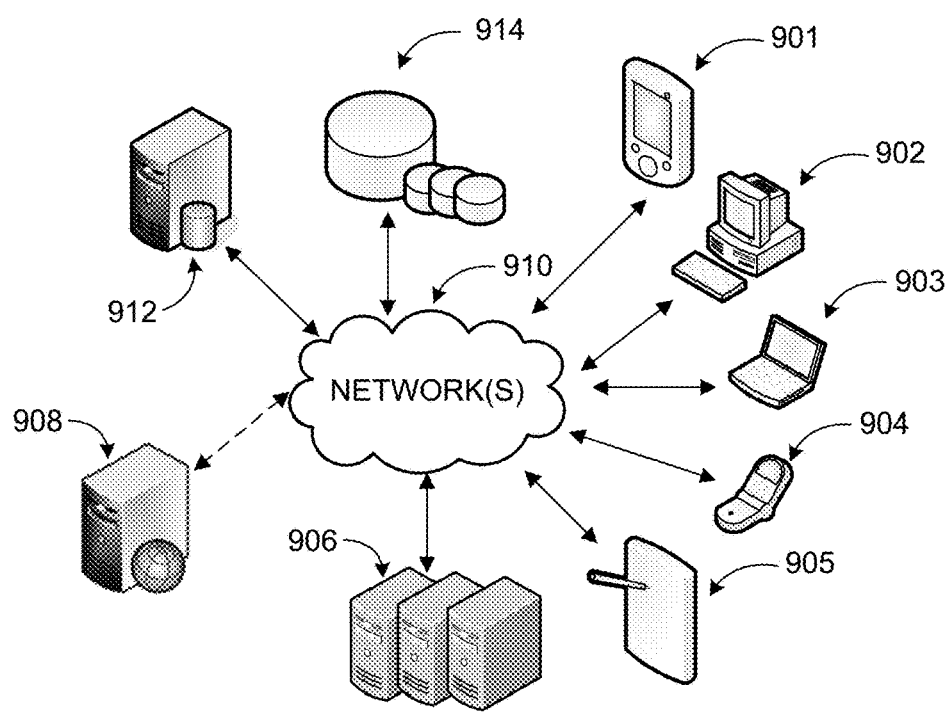
FIG. 9 is a networked environment, where a system according to embodiments may be implemented.

FIG. 9 is a networked environment, where a system according to embodiments may be implemented. A security and compliance module as described herein may be employed in conjunction with hosted applications and services (for example, the client application 106 associated with the hosted service 114, the hosted service 114, or the protection service 114) that may be implemented via software executed over one or more servers 906 or individual server 908, as illustrated in diagram 900. A hosted service or application may communicate with client applications on individual computing devices such as a handheld computer 901, a desktop computer 902, a laptop computer 903, a smart phone 904, a tablet computer (or slate), 905 ('client devices') through network(s) 910 and control a user interface, such as a dashboard, presented to users.

Client devices 901-905 are used to access the functionality provided by the hosted service or client application. One or more of the servers 906 or server 908 may be used to provide a variety of services as discussed above. Relevant data may be stored in one or more data stores (e.g. data store 914), which may be managed by any one of the servers 906 or by database server 912.

Network(s) 910 may comprise any topology of servers, clients, Internet service providers, and communication media. A system according to embodiments may have a static or dynamic topology. Network(s) 910 may include a secure network such as an enterprise network, an unsecure network such as a wireless open network, or the Internet. Network(s) 910 may also coordinate communication over other networks such as PSTN or cellular networks. Network(s) 910 provides communication between the nodes described herein. By way of example, and not limitation, network(s) 910 may include wireless media such as acoustic, RF, infrared and other wireless media.

Many other configurations of computing devices, applications, engines, data sources, and data distribution systems may be employed to provide intelligence and analysis driven security and compliance suggestions. Furthermore, the networked environments discussed in FIG. 9 are for illustration purposes only. Embodiments are not limited to the example applications, engines, or processes.

Figure 10:
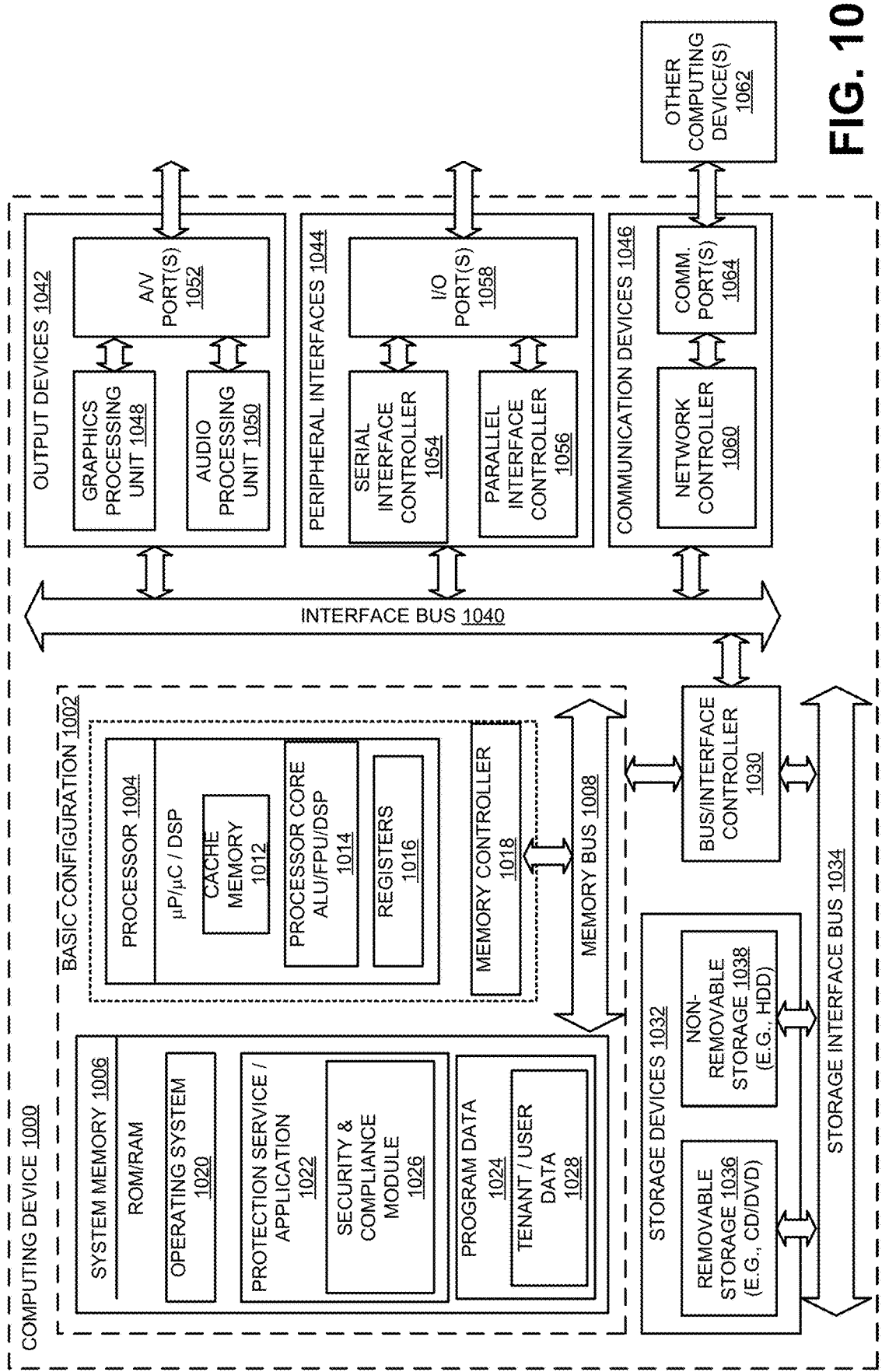
FIG. 10 is a block diagram of an example general purpose computing device, which may be used to provide intelligence and analysis driven security and compliance suggestions.

FIG. 10 is a block diagram of an example general purpose computing device, which may be used to provide intelligence and analysis driven security and compliance suggestions.

For example, computing device 1000 may be used as a server, desktop computer, portable computer, smart phone, special purpose computer, or similar device. In an example basic configuration 1002, the computing device 1000 may include one or more processors 1004 and a system memory 1006. A memory bus 1008 may be used for communicating between the processor 1004 and the system memory 1006. The basic configuration 1002 is illustrated in FIG. 10 by those components within the inner dashed line.

Depending on the desired configuration, the processor 1004 may be of any type, including but not limited to a microprocessor (µP), a microcontroller (µC), a digital signal processor (DSP), or any combination thereof. The processor 1004 may include one more levels of caching, such as a level cache memory 1012, one or more processor cores 1014, and registers 1016. The example processor cores 1014 may (each) include an arithmetic logic unit (ALU), a floating point unit (FPU), a digital signal processing core (DSP Core), or any combination thereof. An example memory controller 1018 may also be used with the processor 1004, or in some implementations the memory controller 1018 may be an internal part of the processor 1004.

Depending on the desired configuration, the system memory 1006 may be of any type including but not limited to volatile memory (such as RAM), non-volatile memory (such as ROM, flash memory, etc.) or any combination thereof. The system memory 1006 may include an operating system 1020, a protection application or service 1022, and program data 1024. The protection application or service 1022 may include a security and compliance module 1026, which may be an integrated module of the protection application or service 1022. The security and compliance module 1026 may be configured to aggregate and analyze data, metadata, and activities associated with a hosted service in order to detect patterns and derive useful insights for applicable policies and/or configurations based on the pattern, from which a suggestion comprising a policy or configuration may be generated and presented to the tenant through a dashboard. The suggested policy or configuration may be presented along with the analysis results and a prompt to confirm implementation of the suggested policy or configuration. Upon receiving a confirmation of the implementation of the suggested policy or configuration, an option may be presented to customize the suggested policy or configuration by modifying the settings suggested based on analysis results. The program data 1024 may include, among other data, tenant/user data 1028, such as the user information, hosted service information, etc., as described herein.

The computing device 1000 may have additional features or functionality, and additional interfaces to facilitate communications between the basic configuration 1002 and any desired devices and interfaces. For example, a bus/interface controller 1030 may be used to facilitate communications between the basic configuration 1002 and one or more data storage devices 1032 via a storage interface bus 1034. The data storage devices 1032 may be one or more removable storage devices 1036, one or more non-removable storage devices 1038, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 1006, the removable storage devices 1036 and the non-removable storage devices 1038 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 1000. Any such computer storage media may be part of the computing device 1000.

The computing device 1000 may also include an interface bus 1040 for facilitating communication from various interface devices (for example, one or more output devices 1042, one or more peripheral interfaces 1044, and one or more communication devices 1046) to the basic configuration 1002 via the bus/interface controller 1030. Some of the example output devices 1042 include a graphics processing unit 1048 and an audio processing unit 1050, which may be configured to communicate to various external devices such as a display or speakers via one or more A/V ports 1052. One or more example peripheral interfaces 1044 may include a serial interface controller 1054 or a parallel interface controller 1056, which may be configured to communicate with external devices such as input devices (for example, keyboard, mouse, pen, voice input device, touch input device, etc.) or other peripheral devices (for example, printer, scanner, etc.) via one or more I/O ports 1058. An example communication device 1046 includes a network controller 1060, which may be arranged to facilitate communications with one or more other computing devices 1062 over a network communication link via one or more communication ports 1064. The one or more other computing devices 1062 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 1000 may be implemented as a part of a general purpose or specialized server, mainframe, or similar computer that includes any of the above functions. The computing device 1000 may also be implemented as a personal computer including both laptop computer and non-laptop computer configurations.

Example embodiments may also include methods to provide intelligence and analysis driven security and compliance suggestions. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 11:
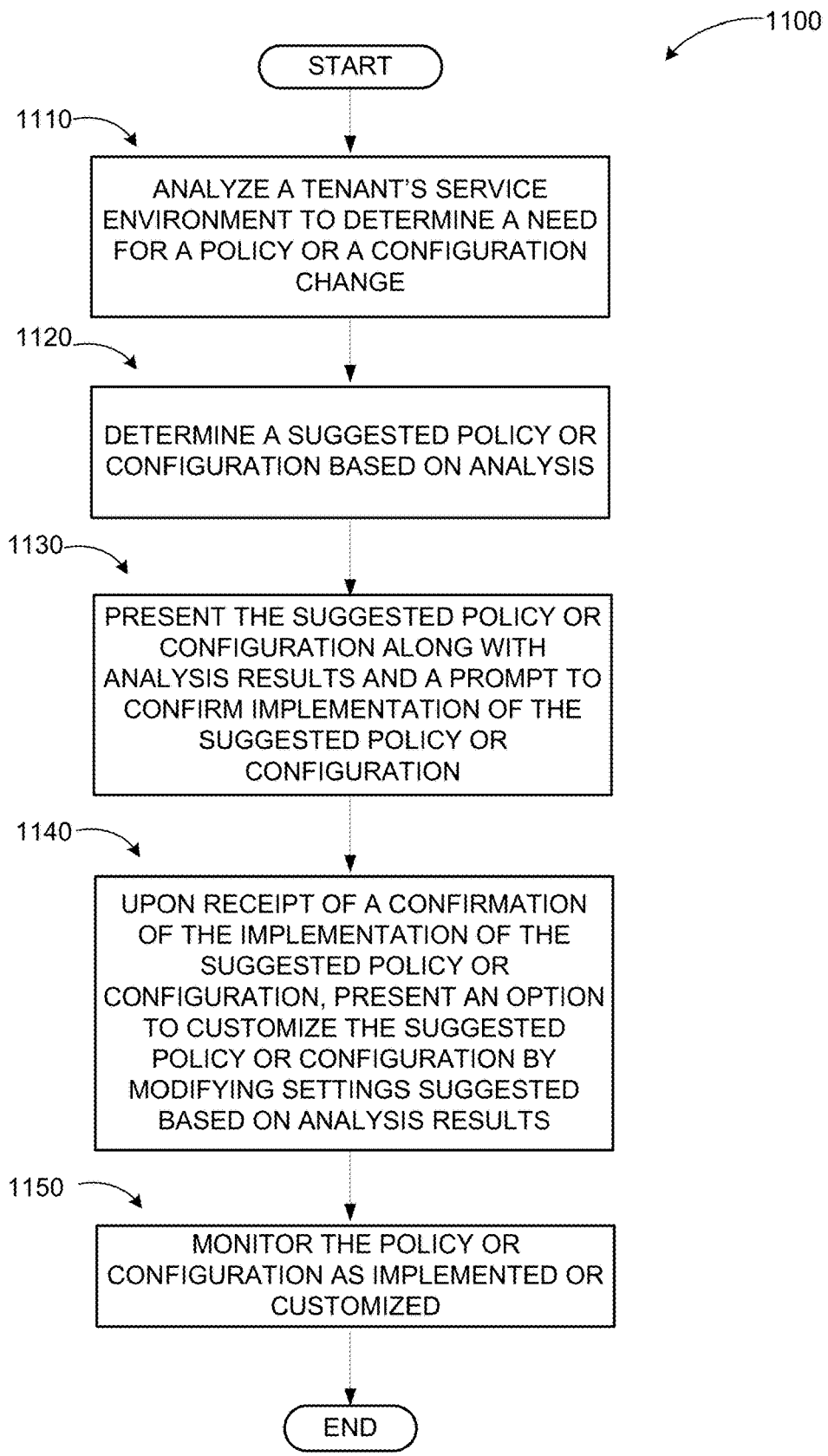
FIG. 11 illustrates a logic flow diagram of a method to provide intelligence and analysis driven security and compliance suggestions, arranged in accordance with at least some embodiments described herein.

FIG. 11 illustrates a logic flow diagram of a method to provide intelligence and analysis driven security and compliance suggestions. Process 1100 may be implemented on a computing device, server, or other system. An example server may comprise a communication interface to facilitate communication between one or more client devices and the server. The example server may also comprise a memory to store instructions, and one or more processors coupled to the memory. The processors, in conjunction with the instructions stored on the memory, may be configured to provide intelligence and analysis driven policy suggestions.

Process 1100 begins with operation 1110, where a tenant's service environment may be analyzed to determine a need for a policy or a configuration change. There need for a policy or configuration change may be determined based on whether a currently implemented policy protects available sensitive information, whether a type of sensitive information is detected within the tenant's service environment, and/or whether the type of sensitive information detected is protected by currently implemented policies or configurations. At operation 1120, a suggested policy or configuration may be determined based on the analysis.

At operation 1130, the suggested policy or configuration along with the analysis results and a prompt to confirm implementation of the suggested policy may be presented through a dashboard, for example. At operation 1140, upon receiving a confirmation of the implementation of the suggested policy or configuration, an option may be presented to customize the suggested policy or configuration by modifying the settings suggested based on analysis results. At operation 1150, the policy or configuration may be monitored as implemented or customized. The policy or configuration may be monitored to determine an effectiveness of its performance in protecting data within the tenant's service environment. A performance report may be created based on the monitoring that is analyzed in order to determine suggested policy or configuration updates.

The operations included in process 1100 are for illustration purposes Intelligence and analysis driven policy suggestions may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a means to provide intelligence and analysis driven security and compliance suggestions for hosted services may be provided. Example means may include analyzing a tenant's service environment to determine a need for a policy or a configuration change, determining a suggested policy or configuration based on analysis results, presenting the suggested policy or configuration along with the analysis results and a prompt to confirm implementation of the suggested policy or configuration, and presenting an option to customize the suggested policy or configuration by modifying settings suggested based on analysis results upon receiving a confirmation of the implementation of the suggested policy or configuration.

According to some embodiments, methods to provide intelligence and analysis driven security and compliance suggestions for hosted services may be provided. An example method may include analyzing a tenant's service environment to determine a need for a policy or a configuration change, determining a suggested policy or configuration based on analysis results, and presenting the suggested policy or configuration along with the analysis results and a prompt to confirm implementation of the suggested policy or configuration. The method may also include presenting an option to customize the suggested policy or configuration by modifying settings suggested based on analysis results upon receiving a confirmation of the implementation of the suggested policy or configuration.

In other embodiments, the suggested policy or configuration may be automatically implemented.

Analyzing the tenant's service environment may include analyzing data, metadata, and activities associated with the tenant and one or more users. Analyzing a tenant's service environment to determine a need for a policy may include retrieving a currently implemented policy or configuration, and determining whether the currently implemented policy or configuration includes protection for available data types. In response to a determination that the currently implemented policy or configuration provides protection for the available data types, a confirmation may be provided. In response to a determination that the currently implemented policy or configuration does not protect the available data types: a particular type of data from the available data types may be detected within the tenant's service environment, a determination of whether the particular type of data detected is protected by the currently implemented policy or configuration may be made, and in response to the determination that the particular type of data detected is not protected by the currently implemented policy or configuration, a policy, a configuration, a policy customization, or a configuration customization to protect the particular type of data may be reactively suggested. In response to detecting no particular types of data from the available data types within the tenant's service environment or that the type of data detected is protected by the currently implemented policy or configuration, a policy or a configuration to protect a type of data that could be potentially stored in the tenant's service environment and is not protected by the currently implemented policy or configuration based on the analysis may be proactively suggested.

In further embodiments, determining the suggested policy or configuration based on analysis results may include detecting a pattern based on the analysis of the tenant's service environment, deriving an insight for an applicable policy or configuration based on the pattern, and generating the suggested policy or configuration based on the derived insight. The suggested policy or configuration may be tailored based on a tenant profile, where the tenant profile may include an industry, a size, a geographical location, a hosted service ecosystem, a role, a regulatory requirement, and/or a legal requirement associated with the tenant. The suggested policy or configuration and the option to customize the suggested policy or configuration may be presented through a dashboard. The suggested policy or configuration may be monitored once implemented, a performance report may be created based on the monitoring, and suggested policy or configuration updates may be suggested based on an analysis of the performance report.

According to some examples, servers configured to provide intelligence and analysis driven security and compliance suggestions for hosted services may be described. An example server may include a communication interface configured to facilitate communication between another server hosting a service, one or more client devices, and the server, a memory configured to store instructions, and one or more processors coupled to the communication interface and the memory and configured to execute a security and compliance module The security and compliance module may be configured to analyze a tenant's service environment to determine a need for a policy or configuration, determine a suggested policy or configuration based on analysis results, present the suggested policy or configuration along with the analysis results and a prompt to confirm implementation of the suggested policy or configuration, and present an option to customize the suggested policy or configuration by modifying settings suggested based on analysis results upon receipt of a confirmation of the implementation of the suggested policy or configuration.

In other examples, the analysis of the tenant's service environment to determine a need for a policy or configuration may be based on whether a currently implemented policy or configuration protects available data types, whether a particular type of data from the available data types is detected within the tenant's service environment, and/or whether the particular type of data detected is protected by the currently implemented policy or configuration. The available data types include financial, tax, health or medical, personal, or business. The security and compliance module may be an integral module of the hosted service, an integral module of a client application locally installed on the one or more client devices, or a separate module associated with a protection service.

According to some embodiments, systems configured to provide intelligence and analysis driven security and compliance suggestions for hosted services may be described. An example system may include a first server configured to host a service for a tenant and one or more users, and a second server. The second server may include a communication interface configured to facilitate communication between the first server and the second server, a memory configured to store instructions, and one or more processors coupled to the communication interface and the memory and configured to execute a security and compliance module. The security and compliance module may be configured to receive data, metadata, and activities associated with the tenant and the users from the first server, analyze the data, metadata, and activities associated with the tenant and the users to determine a need for a policy, a configuration, a policy customization, or a configuration customization, and determine a suggestion based on analysis results, where the suggestion may include a suggested policy, organization, policy customization, or organization customization. The security and compliance module may also be configured to present the suggestion along with the analysis results and a prompt to confirm implementation of the suggestion, present an option to customize the suggestion by modifying settings suggested based on analysis results upon receipt of a confirmation of the implementation of the suggestion, and monitor the implemented suggestion.

In other embodiment, the security and compliance module may be further configured to determine and present another suggestion to customize or update the implemented suggestion based on monitoring results. The another suggestion may include alert generation and management, tenant configuration changes, profile generation, and user interface customization.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to provide a suggestion for a hosted service, the computer-implemented method comprising:
   determining the suggestion based on
      data associated with a tenant of the hosted service,
      metadata associated with the tenant,
      an activity associated with the tenant,
      data associated with a user of the hosted service,
      metadata associated with the user,
      an activity associated with the user, and
      a profile of the tenant;
   providing a prompt to confirm implementation of the suggestion;
   in response to receiving a confirmation to implement the suggestion via the prompt, providing, within a user interface, an option to modify a setting of the suggestion; and
   implementing the suggestion for the hosted service,
   the suggestion including a suggested policy for the hosted service or a suggested configuration for the hosted service.

2. The computer-implemented method of claim 1, wherein implementing the suggestion for the hosted service includes
   automatically implementing the suggestion.

3. The computer-implemented method of claim 1, wherein the profile of the tenant includes an industry, a size, a geographical location, a hosted service ecosystem, a role, a regulatory requirement, or a legal requirement.

4. The computer-implemented method of claim 1, further comprising:
   retrieving a currently-implemented policy of the hosted service or a currently-implemented configuration of the hosted service; and
   determining whether the currently-implemented policy or the currently-implemented configuration includes protection for an available data type.

5. The computer-implemented method of claim 4, further comprising:
   determining whether the available data type is stored within an environment of the tenant within the hosted service.

6. The computer-implemented method of claim 5, wherein determining the suggestion includes determining the suggestion in response:
   the currently-implemented policy or the currently-implemented configuration not providing protection for the available data type, and
   the available data type being stored within the environment of the tenant.

7. The computer-implemented method of claim 5, wherein determining the suggestion includes determining the suggestion in response to:
   the currently-implemented policy or the currently-implemented configuration not providing protection for the available data type, and
   the available data type being potentially stored within the environment of the tenant.

8. The computer-implemented method of claim 1, wherein determining the suggestion includes:
   detecting a pattern based on
      the data associated with the tenant,
      the metadata associated with the tenant,
      the activity associated with the tenant,
      the data associated with the user, and
      the metadata associated with the user;
   deriving an insight based on the pattern; and
   generating the suggestion based on the insight.

9. The computer-implemented method of claim 1, further comprising:
   providing the suggestion within the user interface, wherein the user interface includes a dashboard.

10. The computer-implemented method of claim 1, further comprising:
    monitoring performance of the implemented suggestion; and
    determining an update to the implemented suggestion based on the performance.

11. A system configured to provide a suggestion for a hosted service, the system comprising:
    a memory configured to store instructions; and
    a processor coupled to the memory and configured, via execution of the instructions, to:
       retrieve a currently-implemented policy of the hosted service or a currently-implemented configuration of the hosted service;
       determine whether the currently-implemented policy or the currently-implemented configuration includes protection for an available data type;
       determine whether the available data type is stored within an environment of a tenant within the hosted service;

determine the suggestion in response to:
   the currently-implemented policy or the currently-implemented configuration not providing protection for the available data type, and
   the available data type being stored within the environment of the tenant within the hosted service,
the suggestion based on:
   data associated with the tenant,
   metadata associated with the tenant,
   an activity associated with the tenant,
   data associated with a user of the hosted service,
   metadata associated with the user, and
   an activity associated with the user; and
implement the suggestion.

12. The system of claim 11, wherein the suggestion is further based on a profile of the tenant.

13. The system of claim 11, wherein the suggestion includes a suggested policy for the hosted service or a suggested configuration for the hosted service.

14. The system of claim 11, wherein the processor is further configured to:
   provide, within a user interface, the suggestion and a prompt to confirm implementation of the suggestion; and
   in response to receiving a confirmation to implement the suggestion via the prompt, provide, within the user interface, an option to modify a setting of the suggestion.

15. The system of claim 11, wherein the available data type include financial data, medical data, personal data, or business data.

16. The system of claim 11, wherein the processor is included in a server included in the hosted service.

17. The system of claim 11, wherein the processor is included in a client device accessing the hosted service.

18. A computer readable memory storing instructions that, when executed by one or more processors, perform a set of functions, the set of functions comprising:
   receiving data associated with a hosted service, the data including:
      data associated with a tenant of the hosted service,
      metadata associated with the tenant,
      an activity associated with the tenant,
      data associated with a user of the hosted service,
      metadata associated with the user and
      an activity associated with the user;
   determining, based on the data and a profile of the tenant, a suggestion for the hosted service;
   presenting the suggestion and a prompt to confirm implementation of the suggestion;
   in response to receipt of a confirmation to implement the suggestion via the prompt, implementing the suggestion;
   monitoring performance of the implemented suggestion; and
   providing a suggested update to the implemented suggestion based on the performance.

19. The computer readable memory of claim 18, wherein the suggested update to the implemented suggestion includes an update to alert generation and management, an update to a tenant configuration, an update to profile generation, or an update to a user interface customization.

20. The computer readable memory of claim 18, further comprising, in response to receipt of the confirmation to implement the suggestion via the prompt, presenting, within a user interface, an option to modify a setting of the suggestion.

* * * * *